US005361184A

United States Patent [19]

El-Sharkawi et al.

[11] Patent Number: 5,361,184

[45] Date of Patent: Nov. 1, 1994

[54] ADAPTIVE SEQUENTIAL CONTROLLER

[75] Inventors: Mohamed A. El-Sharkawi, Renton; Jian Xing, Seattle, both of Wash.; Nicholas G. Butler, Newberg, Oreg.; Alonso Rodriguez, Pasadena, Calif.

[73] Assignee: Board of Regents of the University of Washington, Seattle, Wash.

[21] Appl. No.: 963,692

[22] Filed: Oct. 20, 1992

[51] Int. Cl.[5] .............................................. H02H 3/00

[52] U.S. Cl. .......................................... 361/93; 361/2; 361/85

[58] Field of Search ....................... 361/78, 79, 83, 85, 361/88, 100, 2, 3, 5, 6, 7, 9, 93; 364/483

[56] References Cited

U.S. PATENT DOCUMENTS 5,119,260 6/1992 Huhse et al. ........................... 361/2

OTHER PUBLICATIONS

A. Hohm, R. Alvinsson, U. Akesson, & O. Karlen, "Development of Controlled Switching of Reactors, Capacitors Transformers and Lines," Cigre, 1990 Session, 26 Aug.-1st Sep., 10 pp.

R. Alvinsson & C. Solver, "Switching to lower transients," Transmission & Distribution, Mar. 1991, pp. 41, 43, & 45.

R. Alexander, "Synchronous Closing Control for Shunt Capacitors," 1985 IEEE, 85 WM 221-7, pp. 1-7.

ABB HV Switchgear, "Switchsync Relay for synchronous circuit switching" Brochure, Publ. SESWG/B 2001 E, Edition 2, 1991-06, 4 pp.

Joslyn Hi-Voltage Corporation, VBU Faultmaster® Interrupter including Zero Voltage Closing Control Instruction Manual, D.B. 750-201, May 1986, 28 pp.

R. Wolff, "Control of capacitor closing nips surges," *Electrical World*, Transmission/Distribution, Jan. 1, 1979, 6 pp.

N. Witteberg, Westinghouse ABB Power T & D Company publication, "Smooth Energizing of Capacitor Banks," NESA Dristb, Aug. 1989, 12pp.

*Primary Examiner*—A. D. Pellinen
*Assistant Examiner*—Sally C. Medley
*Attorney, Agent, or Firm*—Christensen, O'Connor, Johnson & Kindness

[57] ABSTRACT

An adaptive sequential controller (50/50') for controlling a circuit breaker (52) or other switching device to substantially eliminate transients on a distribution line caused by closing and opening the circuit breaker. The device adaptively compensates for changes in the response time of the circuit breaker due to aging and environmental effects. A potential transformer (70) provides a reference signal corresponding to the zero crossing of the voltage waveform, and a phase shift comparator circuit (96) compares the reference signal to the time at which any transient was produced when the circuit breaker closed, producing a signal indicative of the adaptive adjustment that should be made. Similarly, in controlling the opening of the circuit breaker, a current transformer (88) provides a reference signal that is compared against the time at which any transient is detected when the circuit breaker last opened. An adaptive adjustment circuit (102) produces a compensation time that is appropriately modified to account for changes in the circuit breaker response, including the effect of ambient conditions and aging. When next opened or closed, the circuit breaker is activated at an appropriately compensated time, so that it closes when the voltage crosses zero and opens when the current crosses zero, minimizing any transients on the distribution line. Phase angle can be used to control the opening of the circuit breaker relative to the reference signal provided by the potential transformer.

40 Claims, 12 Drawing Sheets

OPENING OF CB
(NORMAL OPERATION)

ADAPTIVE SEQUENTIAL CONTROLLER

Since this invention was made with government support under grant number DE-BI79-92BP25768, awarded by the U.S. Department of Energy, the U.S. government has certain rights in it.

FIELD OF THE INVENTION

This invention generally relates to a switch control, and more specifically, to a control that enables a solenoid current supplied to actuate a high-voltage switch or circuit breaker in response to a command signal.

BACKGROUND OF THE INVENTION

Transmission and distribution lines often include solenoid actuated high-voltage switches and circuit breakers that are opened and closed in response to a remotely supplied signal, for example, a signal supplied from a system control center or substation control panel. Each time that a switch or circuit breaker opens or closes, the contacts within it may be subjected to deterioration due to arcing, particularly if the line current is interrupted at its peak or if the device is closed at the peak of the periodically varying voltage. Arcing can also produce radio frequency interference (RFI). More importantly, each time that a switch or circuit breaker opens or closes at a current or voltage peak, respectively, damaging transients may be generated on the line by the resulting arcing or prestrikes. For example, if the current in a line connected to a capacitor bank or to a capacitive load is switched, the voltage on the bus may momentarily collapse to zero and then begin to oscillate at high frequencies and at high magnitudes. Such transients can damage equipment connected to the line and are very undesirable.

Conventional switches and circuit breakers are not designed to open or close at times appropriate to minimize stress and arcing. Instead, once a switching command is issued, the devices begin to open or close immediately as current flows through their solenoid actuation circuits. By monitoring the voltage and current on a bus, it would be possible to delay enabling the current to the solenoid that actuates a switch or circuit breaker for an appropriate time interval so that the device actually opens when the current waveform is crossing zero and closes when the voltage waveform is crossing zero. The delay introduced in enabling the electrical current to the solenoid or other actuator of the switch or circuit breaker should therefore include the response time of the device in opening or closing, i.e., an appropriate time for the device to react after its actuator is energized to open or close the switch or breaker contacts. However, the response time of the operating mechanism in the switch or circuit breaker typically changes with use and over time. For example, the force developed by springs used in the operating mechanism tend to change with age and usage, and because of the influence of ambient environmental conditions, such as temperature, barometric pressure, and humidity. Thus, it is not practical to simply measure the response time of a switch or circuit breaker at the time of its manufacture to determine the timing of a switching operation, because after the device has been in operation for several years, its response time will have changed substantially.

The advantages of closing a circuit breaker when the voltage on the line crosses zero and opening the breaker when the current is zero are discussed in a paper entitled, "Switching to Lower Transients," by R. Avinsson and C. Solver, ABB HV Switchgear Corporation, Ludvika, Sweden (March 1991). To reduce transient disturbances caused by operating a circuit breaker to connect a capacitor bank to a 130 KV line used by a Swedish utility, a microprocessor-based device was developed to open and close the circuit breaker when the current and voltage on the line were such as to likely minimize transients. Since long term variations in the circuit breaker closing time were expected, the control device was designed to self adjust the closing and opening times to compensate for such changes. While enabling details are omitted from the paper, it appears that the microprocessor in this device compares the predicted closing (or opening) time with the actual closing (or opening) time and adjusts the predicted time next used to operate the circuit breaker by applying one-half of the measured error. The predicted time used in controlling the circuit breaker is referenced to either the voltage or current on the line. This approach adaptively controls the circuit breaker based on errors in the predicted closure time of the breaker for a purely reactive load, within an error range of $\pm 1$ ms; yet, it does not specifically detect transients caused by operation of the breaker and adaptively control the circuit breaker to eliminate such transients when the breaker is next operated. Other sources of delay in the onset or interruption of current flow through the circuit breaker that might give rise to transients or restrikes, such as environmental conditions, are thus not compensated by the ABB HV Switchgear Corp. circuit breaker control. Furthermore, the device does not seem capable of compensating a breaker when the phase angle between current and voltage on the line is not nearly ninety degrees, i.e., for other than a purely reactive load.

Clearly, a switch controller that compensates for changes in the response time of a switch or circuit breaker operating mechanism under all conditions of operation is desirable. The controller should be able to adapt to changes in the response time of the switching device caused by aging, for virtually any phase angle associated with a load, so that operation of the switching device is initiated at an appropriate time selected to ensure that current flow on the bus is actually enabled and interrupted by the device at near zero voltage and near zero current crossings, respectively, to substantially eliminate switching transients in subsequent switching operations. Further, the controller should compensate for ambient environmental conditions in determining the appropriate times at which to initiate switching operations without producing transients.

SUMMARY OF THE INVENTION

In accordance with the present invention, an adaptive sequential controller for controlling electrical current flow through an alternating current (AC) power line includes transformer means that are capable of coupling to the power line, for producing a timing signal indicative of a zero crossing of at least one of a periodically varying current and a periodically varying voltage on the power line. (As used herein within the specification and in the claims, the term "power line" is intended to include any conductor carrying electrical current produced by a generator, whether at a transmission, distribution, or local level.) Phase angle determinative means are provided for determining a phase angle between the periodically varying current and the periodically varying voltage on the power line and producing a phase angle signal indicative of that phase angle. Transient detector means that are capable of coupling to the power line produce a transient signal indicative of the presence of any transient occurring on the power line when the flow of electrical current through the power line is interrupted or enabled. Coupled to the transient detector means are delay adjustment means that receive the transient signal. The delay adjustment means also are coupled to the transient detector means to receive the timing signal. In response to the transient signal and the timing signal, the delay adjustment means produce a temporal adjustment signal indicative of a time at which the transient occurred relative to the timing signal, and thus, indicative of an adjustment that should be made to actuation times used in initiating the interruption and enablement of electrical current flow through the power line. The actuation times are selected so as to substantially eliminate any transient on the power line by enabling the flow of electrical current through the power line generally when the periodically varying voltage crosses zero and interrupting the flow of electrical current through the power line generally when the periodically varying electrical current crosses zero. Control means are coupled to the delay adjustment means to receive the temporal adjustment signal and are coupled to the phase angle determinative means for receiving the phase angle signal. The control means initiate enablement and interruption of electrical current flow through the power line in response to externally produced switching commands at specific times determined as a function of the temporal adjustment signal and phase angle signal, so that the electrical current is next switched following receipt of a switching command at a time that is selected to avoid producing transients. The delay adjustment means thus compensate for any changes in the inherent delays between the initiation of switching the electrical current flow and an actual enablement or interruption of the flow of electrical current through the power line so as to avoid producing switching transients and restrikes.

One embodiment of the invention (that is used on power lines with relatively constant power factor loads) includes phase angle determinative means that comprise a control, which is adjusted by a user to a predetermined phase angle setting to produce the phase angle signal representing the phase angle on the power line. Another embodiment (used with power lines subject to changes in power factor) includes a current transformer. The phase angle determinative means are coupled to the potential transformer and the current transformer to measure the phase angle between the periodically varying current and voltage on the power line to produce the phase angle signal.

In one application of the present invention, the control means comprise switching means for actuating a circuit breaker on the power line. (The terms "circuit breaker" and "switch" (installed on a power line) or "switching device" as used herein within the specification and the claims are interchangeably intended to encompass any type of electrically controllable device for interrupting or switching electrical continuity between sections of power lines.) The circuit breaker has an inherent delay in switching the flow of electrical current after operation of the device is initiated, and this delay is subject to change. The delay adjustment means determine any changes in the delay of the circuit breaker and produce a corresponding temporal adjustment signal to adjust the actuation times for the circuit breaker during subsequent switching operations. Also provided are a relay control that is in receipt of the externally produced switching commands, and a normally-open relay that is disposed in series with the switching means and the circuit breaker. The normally-open relay is closed by the relay control in response to the switching command before the control means initiate enablement of electrical current flow through the power line. Accordingly, the relay protects against a failure of the switching means that would enable electrical current to flow in the power line other than in response to the switching command.

Preferably, the switching means comprise a solid-state switch. The control means produce a trigger signal that is conveyed to the solid-state switch to enable electrical current to flow through the solid-state switch; this electrical current activates the circuit breaker to control the flow of electrical current in the power line.

The transformer means comprise a current transformer in one preferred embodiment, and the timing signal comprises a current signal produced by the current transformer, which is indicative of zero crossings of the electrical current flowing in the power line. The transient detector means then comprise the current transformer, the current signal produced by the current transformer including an indication of any transient produced by switching the flow of electrical current on the power line, either by enablement of electrical current flow in the power line at other than a zero crossing of the voltage or by interruption of the electrical current flow through the power line at other than a zero crossing of the electrical current flowing therein.

In the preferred form of the invention, the timing signal comprises a low frequency timing signal that is synchronized to the zero crossings and a high frequency signal. The high frequency signal has a frequency that is an integral multiple of the low frequency timing signal and is synchronized to it. The delay adjustment means include comparator means for comparing the transient signal to the low frequency timing signal to produce the temporal adjustment signal.

A method for controlling a switching device disposed on a power line so as to suppress arcing and minimize transients that would otherwise occur when the switching device operates includes steps that are generally consistent with the functions implemented by the adaptive sequential controller discussed above.

The foregoing aspects and many of the attendant advantages of this invention will become more readily appreciated by reference to the following detailed description, when taken in conjunction with the accompanying drawings.

BRIEF DESCRIPTION OF THE DRAWINGS

FIG. 6B is a graph illustrating the signal waveforms used in the adaptive sequential controller after it is adjusted to use the compensation from FIG. 6A, thereby eliminating transients when the circuit breaker closes;

DETAILED DESCRIPTION OF THE PREFERRED EMBODIMENT

Figure 1:
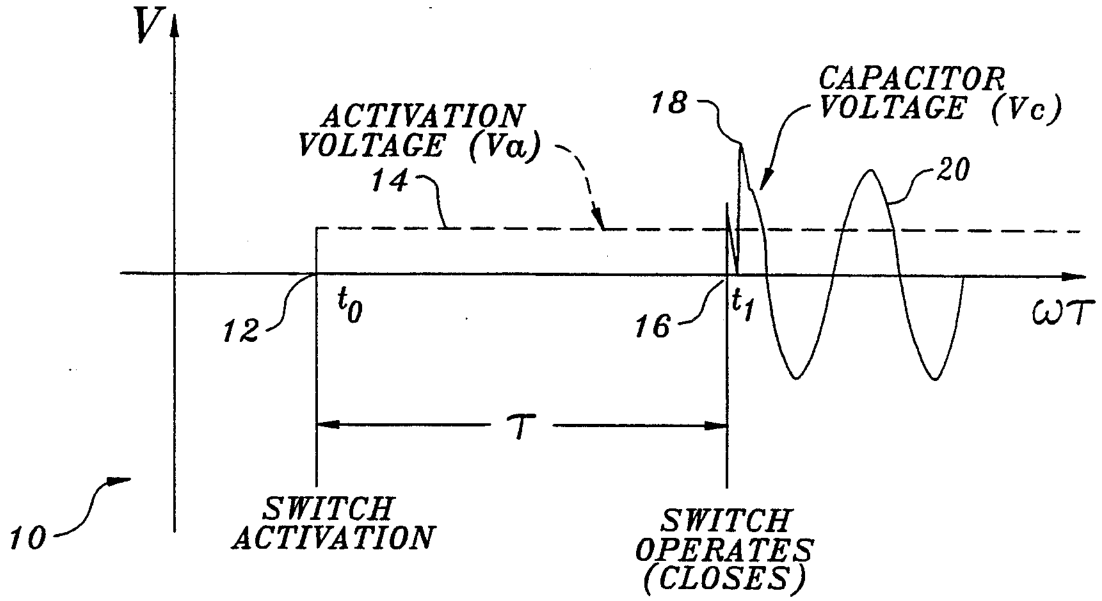
FIG. 1 is a graph of the voltage across a capacitor bank on a power line, illustrating the transient that is produced when a circuit breaker or switch is closed while the line voltage is near a peak value.

Referring to FIG. 1, a graph 10 illustrates the voltage transients that can be developed if a circuit breaker or switch on a high-voltage line connected to a capacitor bank is closed when the line voltage is substantially different than zero. In this example, the switch or circuit breaker is activated by an activation voltage signal $V_a$ applied to its solenoid at a time $t_0$, indicated by reference numeral 12. The time interval during which the circuit breaker activation voltage $V_a$ is supplied is indicated by a dotted band 14 on graph 10. The inherent time delay, $\tau$, of the circuit breaker or switch to respond to the activation voltage elapses at a time $t_1$, indicated by a reference numeral 16, at which point the switch or circuit breaker closes, applying a substantially non-zero line voltage to the capacitor bank load. The sudden application of a near peak line voltage to the capacitor bank causes a voltage transient and ringing to be developed across the capacitor bank. This transient has a maximum voltage amplitude 18, which can be much greater than the normal voltage for which the capacitor bank is rated. After the transient and ringing settle out, a generally normal sinusoidal voltage waveform 20 is evident. However, it is clearly desirable to avoid producing transients with an unacceptable maximum voltage amplitude 18. A more purely sinusoidal waveform can be achieved by activating the switch or circuit breaker closing mechanism at a time $\tau$ seconds prior to the zero crossing of the line voltage.

Figure 2:
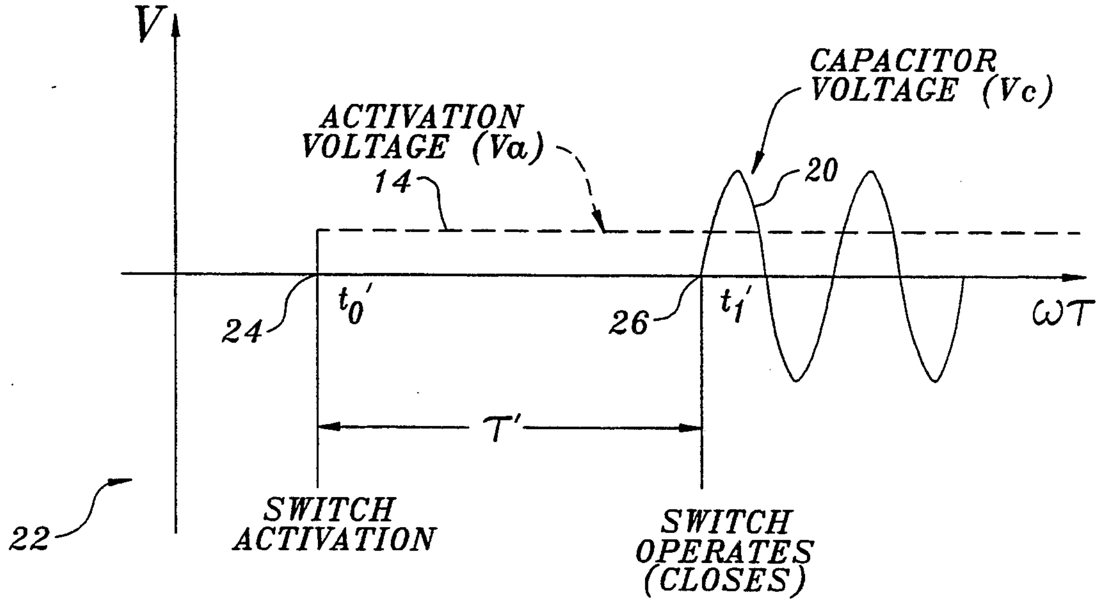
FIG. 2 is a graph of the voltage across a capacitor bank of a power line that is energized by closing a circuit breaker when the line voltage is substantially at a zero crossing.

Unfortunately, even if an appropriate compensation is applied for the inherent delay, $\tau$, of the circuit breaker or switch, changes in the value of $\tau$ due to the aging of the components that mechanically actuate the circuit breaker or switch, and environmental effects such as temperature, barometric pressure, and humidity, can introduce transients by causing the switch or circuit breaker to close at other than substantially zero line voltage. To accommodate changes in the inherent delay, $\tau$, of a circuit breaker or switch, adaptive compensation of the activation time, $t_0$, of the circuit breaker must be made. Accordingly, FIG. 2 shows a graph 22 wherein the benefit of adaptively compensating for a $\tau'$, changed relative to $\tau$, is illustrated. In graph 22, a switch activation voltage $V_a$ is applied at $t_0'$, as indicated by reference numeral 24. Again, the activation voltage $V_a$ indicated by dotted band 14 is applied over the indicated time interval, so that after the delay $\tau'$, the switch closes at a time $t_1'$, which is identified by a reference numeral 26. As a result of closing the circuit breaker or switch when the line voltage is substantially equal to zero, a normal sinusoidal voltage 20, without transients, is immediately applied across the capacitor bank. Elimination of the transient that was produced in the example illustrated by graph 10 is thus one of the most significant benefits derived from the adaptive operation of the circuit breaker or switch made possible by the present invention.

Figure 3:
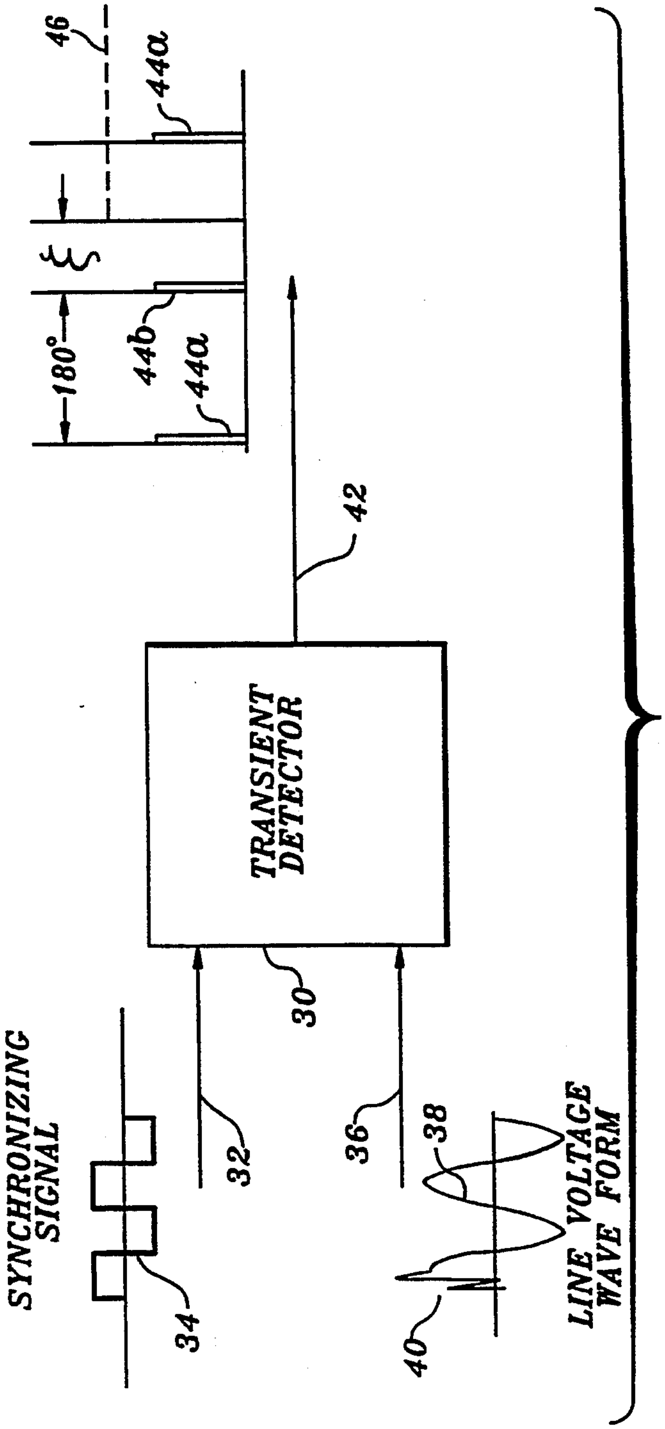
FIG. 3 is a schematic block diagram of a transient detector that determines an adaptive correction in the timing used for actuating a circuit breaker, based upon the time that a transient occurs with respect to a synchronizing signal.
Figure 5:
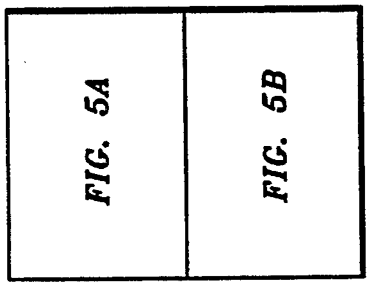
FIGS. 5A and 5B are an electrical schematic diagram of an environmental compensation circuit, the adaptive adjustment circuit, and a phase shift comparator of the adaptive sequential controller.

In order to adapt to a change in the value of $\tau$, i.e., a change in the delay interval after an activation voltage is applied to a circuit breaker or switch before it closes or opens, the duration of the change must be determined by monitoring either the line voltage or the current flowing in the line to detect any transients that occurred when the circuit breaker or switch is activated. To determine a correction that should be applied to compensate for changes in $\tau$, it is necessary to determine at what point in time the circuit breaker or switch actually opened or closed with respect to a reference time. In one preferred embodiment, the reference selected is the voltage waveform. To provide better definition for the reference time, a square wave synchronizing signal 34 (as shown in FIG. 3) is developed that has a zero crossing synchronized to the zero crossing of a periodic sinusoidal voltage 38 on the power line. This synchronizing signal 34 is input through a line 32 to a transient detector 30 and compared with a line voltage transient signal 40, which is developed when the circuit breaker is closed at other than a zero voltage crossing of the line voltage, is applied to transient detector 32 through a line 36. Line voltage transient signal 40 defines when a transient occurred (which should only happen if the value of $\tau$ for the circuit breaker or switch changed from the last value used, or if the value was previously set to the wrong duration). Line voltage transient signal 40 thus indicates the actual closing time of the circuit breaker or switch and also indicates that the value of $\tau$ used in triggering the circuit breaker or switch should be adaptively changed to eliminate a transient on subsequent operations of the circuit breaker or switch.

An output signal 42 from transient detector 30 includes an indication of the error, $\xi$, by which $\tau$ must be adjusted to compensate for any change in the reaction time of the switch or circuit breaker. This error, which may be either a positive or negative value, is determined with respect to one of pulses 44*a*, which occur on the rising edge of synchronizing signal 34, or one of pulses 44*b*, which occur on the trailing edge of synchronizing signal 34, 180° after each pulse 44*a*. Thus, the time between either pulse 44*a* or pulse 44*b* and a transient pulse 46 determines the error, $\xi$. Transient pulse 46 is developed by differentiating a voltage signal to enlarge the relatively high frequency transient. The same arrangement can be applied for determining the circuit breaker or switch timing error with respect to opening of the circuit breaker or switch, which may be different than the timing error for closing it; opening of a circuit breaker or switch should occur only when the current flowing through the device is zero to substantially eliminate transients and restrikes. Closing the circuit breaker or switch when the voltage is substantially different than zero, or opening the circuit breaker or switch when the current through it is substantially different than zero typically produces a transient, indicating that adaptive compensation, due to changes in the value of $\tau$, are required during the next such operation of the device in order to substantially eliminate such transients. Just as the transients can be determined by monitoring either the current or voltage on the power line, so can the reference for determining when to open such a device be developed either directly, by monitoring the zero crossing of current, or indirectly, by monitoring the zero crossing of voltage on the line and the phase angle between current and voltage so that the zero crossing of current is determined. If the phase angle between the current and voltage is known (assuming it is relatively constant) or if it is measured, the zero crossing of current is readily determined by applying the phase angle to the zero crossing of voltage.

Figure 4:
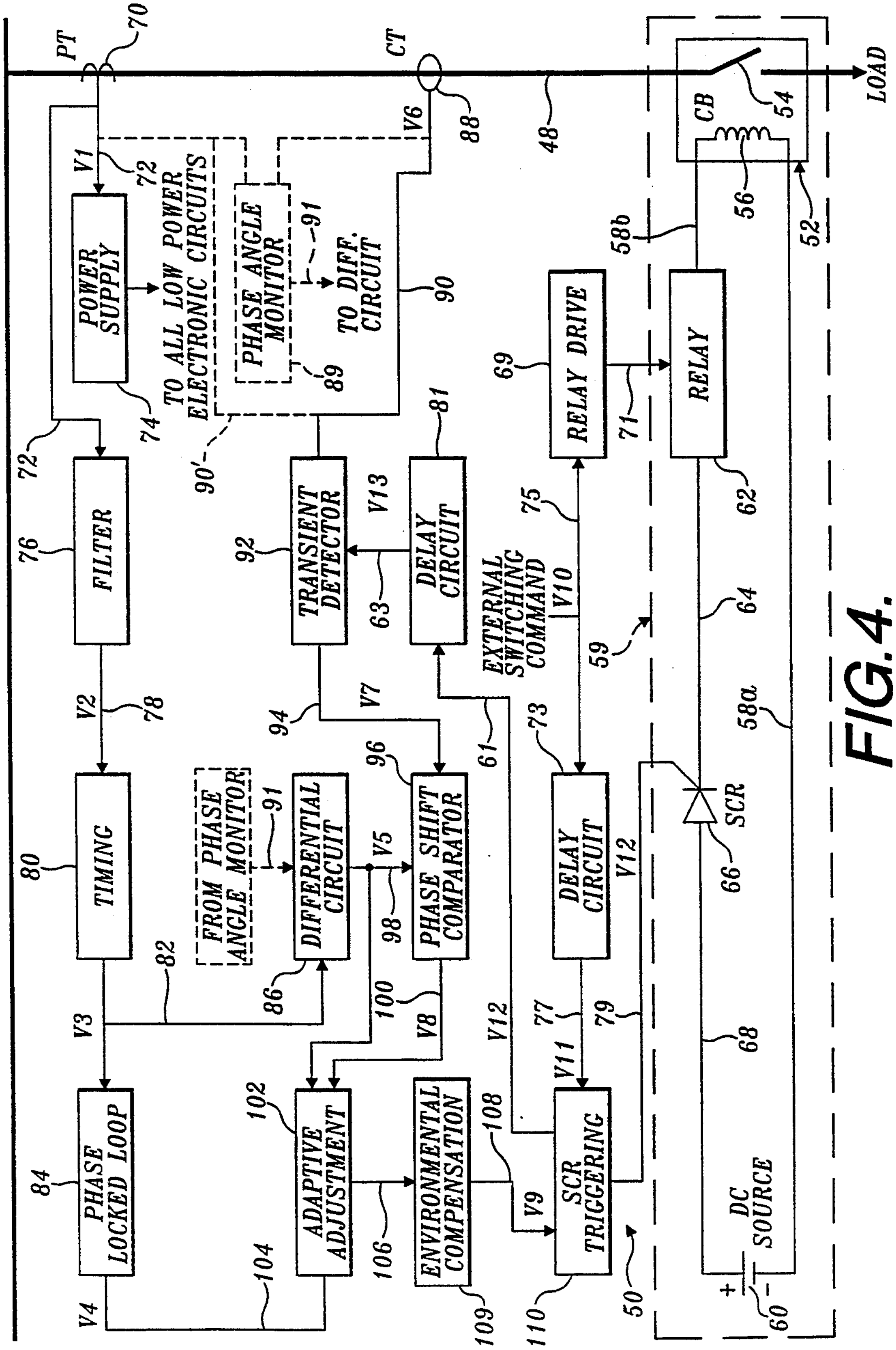
FIG. 4 is a schematic block diagram of an adaptive sequential controller for controlling the closure of a circuit breaker or switch in accordance with the present invention.

Referring now to FIG. 4, a block diagram of a first embodiment of adaptive sequential controller 50 that is used for controlling the opening or closing of a circuit breaker 52 in accordance with the present invention is shown. One adaptive sequential controllers 50 is used for opening circuit breaker 52, and another adaptive sequential controllers 50 is used for closing the circuit breaker to accommodate different reaction times for the opening and closing sequence. Circuit breaker 52 is installed on a distribution line 48 to control current flow to a load (not shown—disposed below or down line of the circuit breaker) and is illustrated as a single-phase device, but may also represent the circuit breaker for one phase of a multi-phase circuit breaker, each phase of which is separately controlled by a different solenoid coil 56. To accommodate differences in the phase angle between voltage and current on each phase of a multi-phase power line, i.e., for use with a multi-phase circuit breaker on an imbalanced power line, two separate adaptive sequential controllers 50 are required for each phase of the circuit breaker, one for controlling opening of the circuit breaker and one for controlling closing of the circuit breaker, or a total of six adaptive sequential controllers 50. Since the circuit breaker section for each phase is then separately controlled to compensate for the operating parameters of the circuit breaker section in opening or closing, differences in the angle between the phase voltages will not adversely affect the adaptive sequential controller operation.

On power lines with substantially balanced loads, e.g., transmission lines, it is possible to use adaptive sequential controller 50 to control opening or closing of all three phase sections of the breaker by supplying an appropriate 120 degree offset in the control signal for the solenoid that actuates each of the three different phases of the circuit breaker—either to open or close. The operation of the adaptive sequential controller is then referenced to only one phase, but controls all three.

Circuit breaker 52 is opened or closed each time that an activation voltage is applied across solenoid 56, through leads 58*a* and 58*b*. Lead 58*a* connects directly to the negative terminal of a DC source 60 that is remotely located, for example, in a substation control room (not shown). Lead 58*b* is connected to a relay 62, which is normally open. Current from DC source 60 flows via a lead 64 through relay 62, when it is closed, into lead 58*b*. Lead 64 is connected to the cathode of a silicon controlled rectifier (SCR) 66 and, when the SCR is triggered to a conductive state in response to a signal V12 from SCR triggering circuit 110 conveyed on a lead 79, carries current from DC source 60 to relay 62. The anode of SCR 66 is coupled to the positive terminal of the DC source through a lead 68. In the event that adaptive sequential controller 50 is used to control a plurality of phases on a multi-phase breaker (of which contacts 54 comprises only one phase section thereof) of a balanced load multi-phase line, a suitable predetermined delay is provided by SCR triggering circuit 110 in producing signals V12 for each of the other phases. For example, for a three phase power line 48, a predefined 120 degree delay would be provided by SCR triggering circuit 110 for each successive signal V12 used to control a corresponding SCR 66 on the other phases (not shown). Each circuit breaker section of the multi-phase circuit breaker is then actuated in sequence in response to the adaptive sequential controller, based on the zero voltage crossing of only one phase for closing, and based on the phase angle/zero current crossing for that one phase when opening the multi-phase circuit breaker.

In order for solenoid 56 in circuit breaker 52 to be energized to open or close the circuit breaker, relay 62 must be closed and SCR 66 must be activated to convey current from DC source 60. An external switching command, applied over a lead 75 through a relay drive 69 and a lead 71, energizes relay 62, which energizes solenoid 56 to initiate opening or closing of contacts 54 in circuit breaker 52. Delay circuit 73, which also receives the external switching command via lead 75, delays application of the switching command signal via a lead 77 to SCR triggering circuit 110 for a few milliseconds to ensure that relay 62 has closed before SCR 66 is turned on. By including relay 62 in series with SCR 66, any fault in SCR 66 (causing it to conduct current) is precluded from actuating circuit breaker 52 at times other than in response to the external switching command signal. An alternating current (AC) line voltage signal V1 (120 volts) produced on the secondary of a potential transformer 70 is conveyed on leads 72 to a power supply 74 and to a filter 76. The power supply converts the relatively low voltage AC to appropriate DC voltages that are used to energize the electronic circuitry comprising adaptive sequential controller 50. Filter 76 removes substantially all of the harmonic distortion on the periodic AC signal, producing a substantially pure sinusoidal signal on a line 78, at the output of the filter.

Figure 6A:
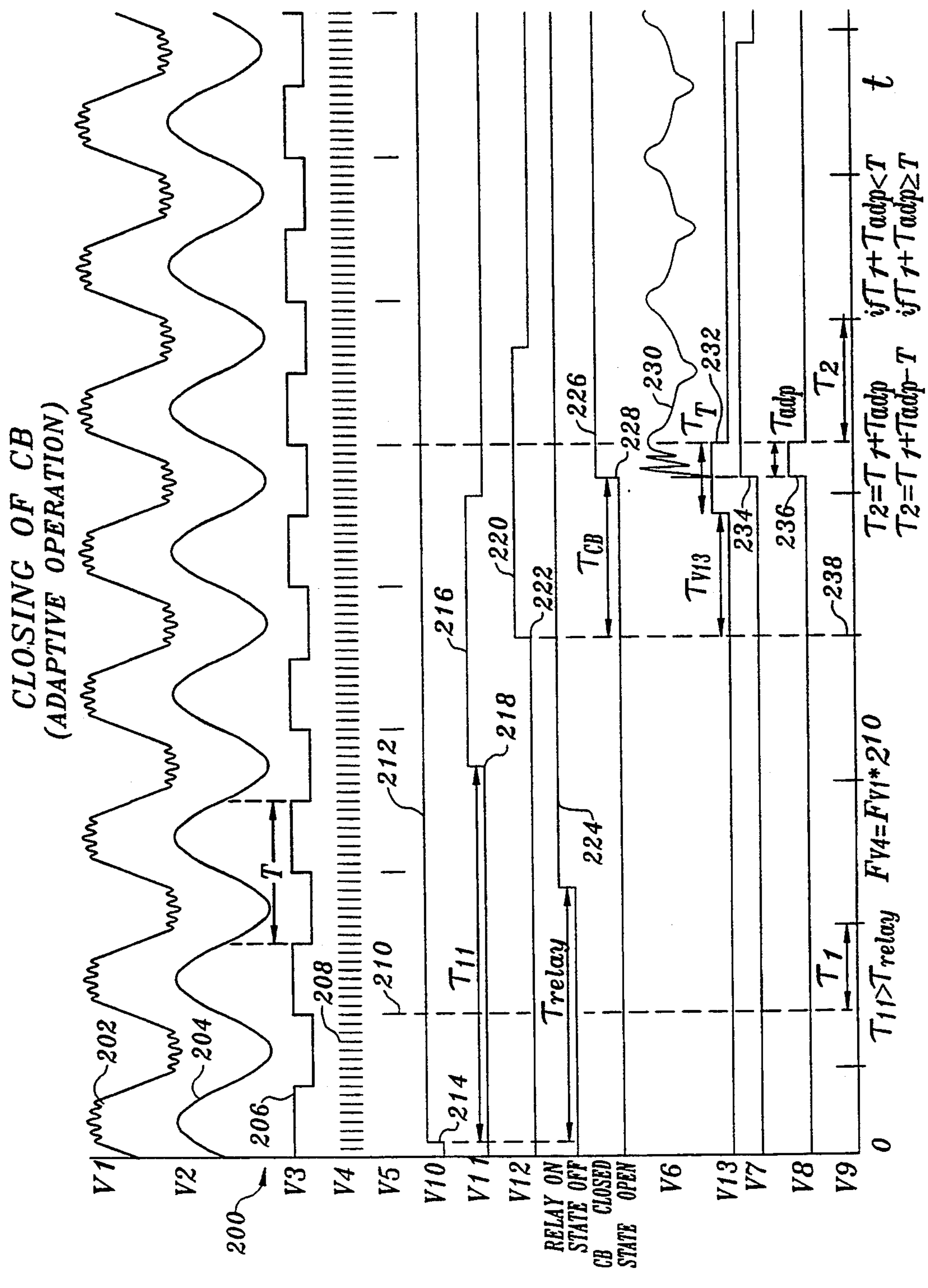
FIG. 6A is a graph illustrating the various signal waveforms used in the adaptive sequential controller for determining a compensation to control the closing of a circuit breaker to minimize transients.

Each of the signals used by adaptive sequential controller 50 during the process of determining a change in the value of $\tau$ that should be applied to compensate for changes in the operating time of the circuit breaker are shown in FIG. 6A. The signals are identified as V1 through V13 and in addition, include reference numbers identifying the specific pulses or waveforms. Thus, for example, line voltage signal V1 includes distorted peaks 202 prior to the removal of such distortion by filter 76, yielding a filtered line voltage signal V2 having an undistorted waveform 204.

The signal output from filter 76 is used by a timing circuit 80 that detects each zero crossing of the periodically varying sinusoidal waveform and produces a corresponding synchronizing signal V3, comprising a square wave 206 that has rising and falling edges corresponding to the time when filtered line voltage signal V2 crosses zero.

A synchronizing signal V3, comprising square wave 206, is input to a phase-locked loop circuit 84 and to a differential circuit 86. The phase-locked loop circuit produces a signal V4 comprising relatively high frequency pulses 208 (high frequency compared to the line frequency) that are phase-locked to 50/60 Hz square wave signal 206. The purpose of producing high frequency pulses 208 is to improve the resolution and definition with which the required adaptive adjustment in $\tau$ is determined. In the preferred embodiment, signal V4 has a frequency 1,024 times the frequency of square wave signal 206, e.g., 61.44 KHz for a 60 Hz square wave signal. It will also be understood by those of ordinary skill in the art that square wave signal 206 may be a 50 Hz signal, corresponding to the AC line frequency used by many utilities throughout the world, some other frequency that is derived from the line frequency. Furthermore, signal V4 can have a substantially different frequency than that used in the preferred embodiment, to achieve other levels of resolution.

Differential circuit 86 processes square wave signal 206, producing a positive going, zero-crossing voltage signal V5 comprising successive pulses 210 that are coincident with each a positive going, zero-crossing voltage (rising edge) of square wave 206. In other words, a pulse 210 is produced at the beginning of each cycle of square wave 206 to serve as a reference point for determining the actual time that circuit breaker 52 closes (and the required correction or adaptive change to apply, based upon the time at which any transients are produced).

Transients can be detected using the potential signal produced by potential transformer 70. Alternatively, a current transformer or potential transformer (neither shown) down line from circuit breaker 52 can be used for this purpose. In the preferred embodiment, the secondary of a current transformer 88 that monitors current flow through distribution line 48 is used to provide a current signal indicative of transients produced by closure of circuit breaker 52 at other than a zero potential on distribution line 48.

Lines 72 and 90 are connected to a phase angle monitor 89 that measures the phase angle between current and voltage on distribution line 48 to provide a phase angle signal carried on a line 91 that is connected to differential circuit 86. The phase angle signal is used in connection with adaptive control of circuit breaker 52 when it is to be opened, by enabling the zero crossing of current to be determined by reference to the zero crossing of voltage on the distribution line, as explained in greater detail below. If the load controlled by circuit breaker 52 represents a relatively constant phase angle, a phase angle control (not separately shown) provided in differential circuit 86 can be manually adjusted to the constant phase angle setting, producing a phase angle signal corresponding to the known phase angle between current and voltage on distribution line 48. The phase angle signal is combined with synchronizing signal V3 to produce signal V5, which is used to determine an appropriate time for activating the circuit breaker to open, coincident with the expected zero crossing of current (but actually referenced to the monitored zero crossing of voltage). Signal V5 is also input to adaptive adjustment circuit 102.

Current transformer 88 is connected by lead 90 to a transient detector circuit 92. A signal V6 produced by the secondary winding of current transformer 88 includes a transient in the first few ms of a current waveform signal 230 if circuit breaker 52 closes at other than the zero potential, indicating that a change in the value used for $\tau$ is required to compensate for changes in the operating time of circuit breaker 52. If circuit breaker 52 closes at a zero potential on distribution line 48, no transients are produced. Transient detector 92 responds to any high frequency transient that is produced (during a short time window, when it is appropriate to determine if adaptive compensation of $\tau$ is required), producing a signal V7 comprising a square pulse 234 having a rising edge that is coincident with the inception of any such transient and lasting about three cycles of the line frequency. Signal V7 is conveyed from transient detector 92 over a line 94 to a phase shift comparator 96. Alternatively, as noted above, signal V7 can be produced in response to any transients monitored using potential transformer 70 that are conveyed to transient detector 92 over a line 90' that is connected to the secondary of potential transformer 70.

Phase shift comparator 96 determines the relative phase angle (or time interval) between a rising edge 228 of a pulse 226, which indicates closure of circuit breaker 52, and the next successive pulse 210 produced by differential circuit 86. A signal V8 comprising a pulse 236 is thus output from phase shift comparator 96 over a line 100, which is coupled to the input of an adaptive adjustment circuit 102. The duration between the rising and falling edges of pulse 236 corresponds to a time, $\tau_{adp}$, which represents a required adjustment to the previous value used for compensating changes in the delay time of circuit breaker 52 that should be applied when circuit breaker 52 is next actuated.

An initial or previously determined compensation time, $\tau_1$, in connection with the value $\tau_{adp}$, is used by adaptive adjustment circuit 102 to determine the new compensation time $\tau_2$ that will next be applied to substantially eliminate any transients on distribution line 48. Adaptive adjustment circuit 102 determines the appropriate time to activate circuit breaker 52, compensated for changes in its response time, so as to substantially eliminate transients. This compensated time is output by adaptive adjustment circuit 102 on a line 106 that is coupled to an environmental compensation circuit 109. The environmental compensation circuit modifies the compensated time as appropriate to offset changes in the response time of circuit breaker 52 caused by ambient temperature, barometric pressure, and humidity. Environmental compensation circuit 109 produces a signal V9 that is conveyed on a line 108 to SCR triggering circuit 110. Signal V9 is a sequence of short pulses at spaced intervals that establish the rising edge of a gating signal V12. Signal V12 is applied over a line 79 to the gate of SCR 66 to trigger it into a conductive state so that the SCR will carry current to energize solenoid 56 and actuate circuit breaker 52.

Although signal V9 controls the timing for the rising edge of gating signal V12, the gating signal is only produced by SCR triggering circuit 110 upon receipt of a signal V11, which is conveyed from delay circuit 73, via a line 77, in response to external switching command signal V10. External switching command signal V10 is supplied from an external source each time that circuit breaker 52 is to be actuated and thus controls the circuit breaker, subject to the appropriate time delay dictated by signal V9. As noted above, external switching command signal V10 is also supplied via line 75 to relay drive circuit 69, which produces the signal to activate relay 62, closing it to enable activation of circuit breaker 52 in response to switching command signal V10. Relay 62 provides fail-safe control of circuit breaker 52, preventing it from being activated, for example, should SCR 66 fail in a short circuit condition.

Delay circuit 73 appropriately delays the external switching command signal V10, also applied to SCR triggering circuit 110, to provide sufficient time for relay drive 69 to close relay 62. The delay provided by delay circuit 73 prevents the SCR from attempting to actuate the circuit breaker before relay 62 has closed.

Figure 5A:
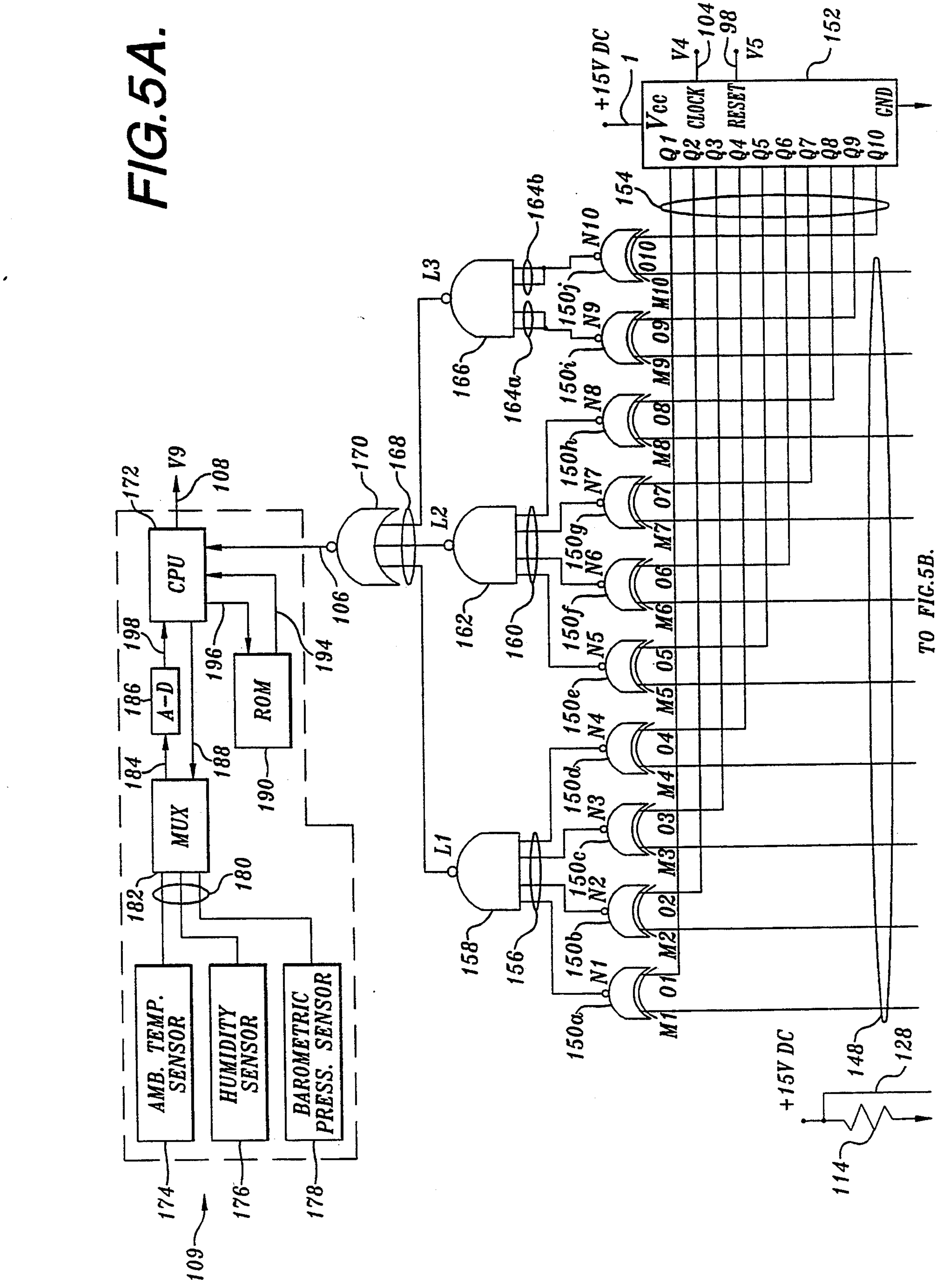
Figure 5B:
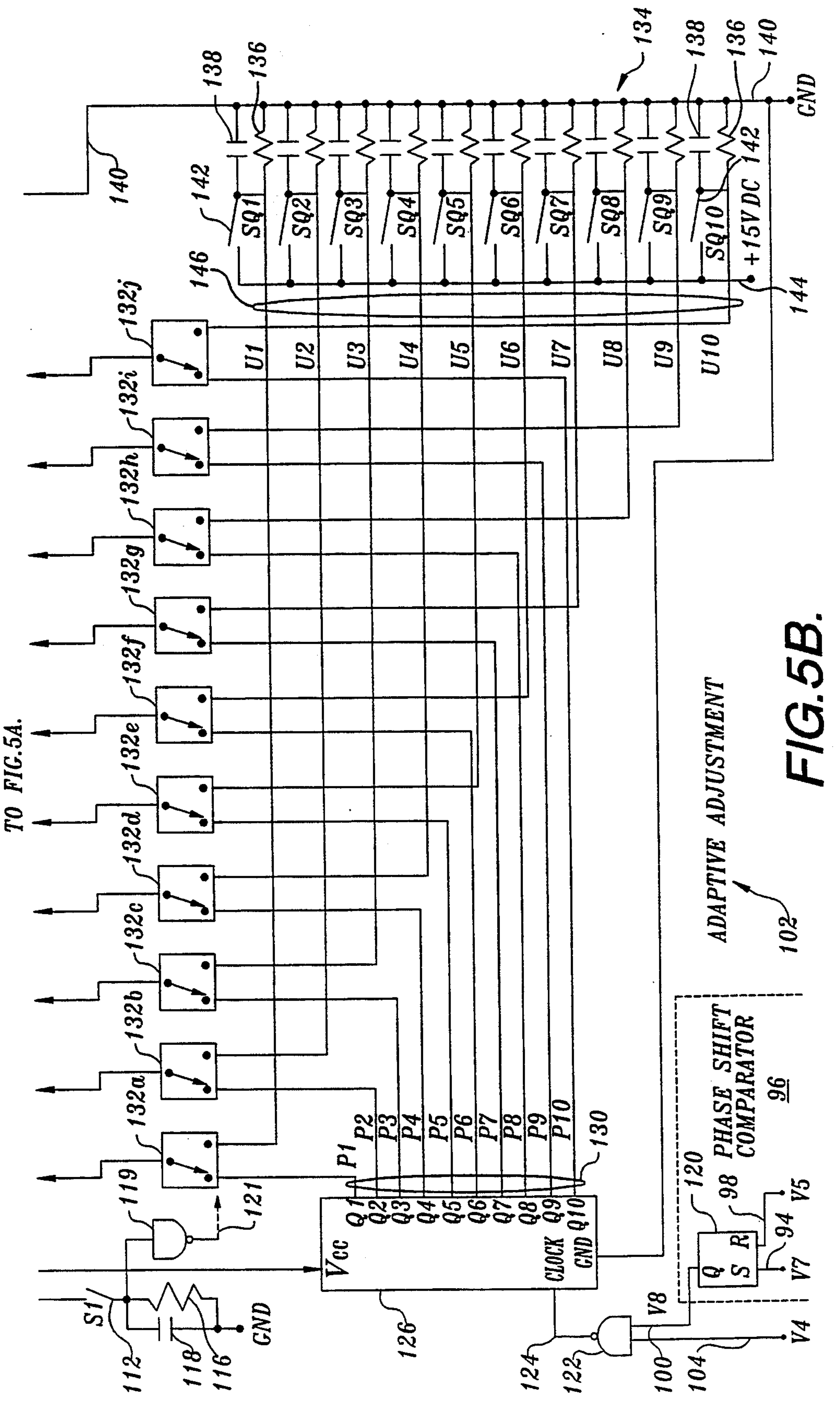

Details of adaptive adjustment circuit 102 are shown in FIGS. 5A and 5B. FIG. 5B also illustrates the principal component of phase shift comparator 96, i.e., a flip flop 120 having its reset terminal connected to line 98 to receive signal V5 and its set terminal connected to a line 94 to receive signal V7. In response to these two signals, the phase shift comparator produces signal V8 that is conveyed by line 100 to one input of a NAND gate 122. The other input of NAND gate 122 is connected to a line 104 to receive signal V4. The output of NAND gate 122 is connected by a line 124 to a clock terminal of a binary counter 126. When both signals V4 and V8 ($\tau_{adp}$) are high, a logic level low (binary zero) output signal is sent over line 124; otherwise, the input to the clock terminal is a logic level high (binary one).

Binary counter 126 accumulates a binary count of the high frequency clock pulses comprising signal V4 during pulse 236, a time interval equal to $\tau_{adp}$. However, the count accumulated by binary counter 126 is cumulative, representing the total of the prior value of the compensation time, $\tau_1$, and an appropriate adaptive correction. If the total exceeds a period, T, (the period of the line frequency), then the accumulated count in the binary counter starts over. The accumulated count is conveyed as a binary value (P1 through P10) on lines 130, each binary digit being input to a different one of ten bilateral switches 132*a* through 132*j*. The other input of each bilateral switch is connected by a line 146 to a different switch 142, identified as SQ1 through SQ10. The other side of switches 142 are connected to +15 VDC through a line 144. A set of resistors 136 are each connected in parallel with a corresponding number of capacitors 138 between a grounded line 140 and lines 146. Switches 142 enable manually setting the compensation time for circuit breaker 52. By selectively closing specific switches 142, an operator selects a preset binary count (U1 through U10) that serves as an alternative to use of binary counter 126, which adaptively determines the compensation time. The provision for manual entry of a compensation time is included to cover situations in which automatic adaptive compensation is not desired.

Bilateral switches 132 select either the adaptively determined count (P1 through P10) from binary counter 126 or the manually preset count (U1 through U10) from switches 142 in response to a control signal that is input to each bilateral switch over a line 121. The control signal that selects the cumulative count from binary counter 126 is applied at the output of an inverter gate 119 when a switch 112 is manually closed by an operator. One side of switch 112 is connected to a resistor 116 and a capacitor 118, which are connected in parallel to ground, and the other side of switch 112 is connected to one end of a resistor 114. The other end of resistor 114 is connected to +15 VDC through a lead 128. When switch 112 is closed, a logic level one is input to inverter gate 119; a resulting logic level zero on the output of inverter gate 119 causes bilateral switches 132 to select the inputs that are connected to receive the binary count P1 through P10 on binary counter 126. If switch 112 is opened, bilateral switches 132 respond to a resulting logic level one on line 121 by selecting the binary count U1 through U10, which is manually preset by closure of certain of switches 142.

The binary count selected by bilateral switches 132 is output on lines 148, each of which is separately connected to one input of a different exclusive NOR (XNOR) gate 150*a* through 150*j*. The other input of each XNOR gate is connected to a different one of ten terminals Q1 through Q10 on a binary counter 152 by lines 154. The clock terminal of binary counter 152 is connected to line 104 to receive signal V4, and the reset terminal is connected to line 98 to receive signal V5. Consequently, binary counter 152 is reset with each rising edge of signal V5 so that it accumulates the relatively high frequency pulses comprising signal V4. Each XNOR gate 150 produces a logic level one at its output only when both of its inputs are at the same logic level, i.e., the output signals from all of the XNOR gates are at logic level one only when the count from bilateral switches 132 equals the count from binary counter 152. In essence, the count accumulated in binary counter 126 determines the adaptively compensated time interval for use in controlling subsequent operations of circuit breaker 52, and the count accumulated by binary counter 152 provides a time reference for initiating operation of the circuit breaker with the adaptive compensation time interval developed by binary counter 126.

The output signals from XNOR gates 150*a* through 150*d* are applied to the four input terminals of a quad input NAND gate 158 over lines 156. Similarly, the output signals of XNOR gates 150*e* through 150*h* are applied to the four input terminals of a quad input NAND gate 162 over lines 160. Finally, the outputs of XNOR gates 150*i* and 150*j* are separately applied to two pairs of input terminals of a quad NAND gate 166 over lines 164*a* and 164*b*, respectively. The output signals of NAND gates 158, 162, and 166 are at a logic level zero only when all input terminals of the NAND gates are at a logic level one, i.e., when only the accumulated count of binary counters 126 and 152 are equal. To consolidate this logical condition, the output terminals of the three NAND gates are separately applied to the input terminals of a NOR gate 170 over lines 168. It should be apparent that the output signal of NOR gate 170 is a logic level one only when all of its input terminals are at logic level zero.

The signal output from NOR gate 170 is conveyed on line 106 to a central processing unit (CPU) 172 in environmental compensation circuit 109. The environmental compensation circuit comprises an ambient temperature sensor 174, a humidity sensor 176, and a barometric pressure sensor 178, all of which are connected by lines 180 to three inputs of a multiplexer (MUX) 182. MUX 182 sequentially selects each of the ambient temperature, humidity, and pressure sensors in turn to provide an input over a line 184, to an analog-to-digital (A-D) converter 186 in response to a control signal supplied from CPU 172 over a line 188. The selected input parameter, i.e., ambient temperature, humidity, or pressure, is convened to a digital value by A-D converter 186 and input to CPU 172 over a line 198.

CPU 172 responds to a program stored in a read only memory (ROM) 190 in carrying out the environmental parameter compensation of the signal output from NOR gate 170. Specifically, it uses each of the environmental parameters to determine an entry point into a look-up table stored in ROM 190, specifying the address of a value stored therein over address lines 196. The value from the table is returned to the CPU over data lines 194. This value is used to adjust the time interval between successive pulses that are produced by CPU 172 as a function of the signal from NOR gate 170, thereby producing pulses 238, which comprise signal V9. The values in the look-up table are empirically determined for a specific manufacturer and model of circuit breaker 52, based on the changes in the response time of the circuit breaker due to ambient temperature, humidity, and barometric pressure. Accordingly, signal V9 is adaptively adjusted not only to compensate for changes in the circuit breaker due to aging and use, but also for changes due to environmental conditions.

Signal V9 is input to SCR triggering circuit 110 over line 108 to determine when the rising edge of signal V12 occurs. From the previous discussion, it will be recalled that signal V12 gates SCR 66 into a conductive state. In addition to providing signal V12 to SCR 66, SCR triggering circuit 110 supplies signal V12, via a line 61, to a delay circuit 81. Delay circuit 81 develops a delay, $\tau_{V13}$, between the rising edge of signal V12 (or pulse 238 comprising signal V9) and the rising edge of time interval $\tau_T$ that defines a window during which any transient developed on distribution line 48 as a result of the operation of circuit breaker 52 is detected by transient detector 92. A pulse 232 extending over the time internal $\tau_T$ is supplied as an enabling signal V13 to transient detector 92, allowing it to respond to transients only during the time when such transients are likely to be developed, for example, as a result of the closure of circuit breaker 52 at other than a non-zero crossing point for the voltage on distribution line 48.

As represented in FIG. 6A, transient signal V6 is developed if circuit breaker 52 closes, when the closure occurred at other than a zero crossing of the voltage on distribution line 48, e.g., due to changes in the response time of the circuit breaker as a result of aging. In response to the transient signal, transient detector 92 produces signal V7 comprising a pulse 234, to indicate the time at which the transient started, and lasting for about three cycles of the line frequency. Since any such transient starts when the circuit breaker closes at other than a zero voltage crossing, signal V7 also indicates the actual time at which circuit breaker 52 closed. The difference between the time that the circuit breaker closes and the time when the voltage on distribution line 48 next crosses zero (indicated by signal V5) is used by phase shift comparator 96 to determine pulse 236, which corresponds to the adaptive time compensation, $\tau_{adp}$. This adaptive time compensation is supplied as signal V8 to adaptive adjustment circuit 102, which adjusts the timing for signal V9 as explained above. The adjustment in the timing between the two successive pulses 238 comprising signal V9 (a change caused by including $\tau_{adp}$) is evident in the interval with $\tau_2$ in FIG. 6A. Following the $\tau_{adp}$ adjustment, the interval between successive pulses 238 remains constant, as indicated in FIG. 6B, until another adjustment is needed.

Operation of circuit breaker 52 in response to this adaptive adjustment of the timing for initiating signal V12 is illustrated in FIG. 6B. In this figure, circuit breaker 52 as controlled by the present invention is closed as the voltage on distribution line 48 crosses zero. Consequently, signal V6 does not include any significant transient; instead, there is almost no variation between the first cycle of current waveform 230 and subsequent cycles. Since closure of circuit breaker 52 is coincident with the time that the voltage on distribution line 48 crosses zero and no transient is produced, the value of $\tau_2$ remains unchanged the next time that the circuit breaker is closed, if there is no change in circuit breaker operating time due to ambient conditions or aging.

As indicated at the bottom of FIG. 6A, the new compensation time $\tau_2$ (compared to a previous compensation time $\tau_1$) is determined as a function of $\tau_{adp}$ using one of two equations; the equation used is dependent upon the sum of $\tau_1$ and $\tau_{adp}$. Specifically, if $\tau_1+\tau_{adp}<T$ (where T is one period of undistorted waveform 204), then $\tau_2=\tau_1+\tau_{adp}$. Conversely, if $\tau_1+\tau_{adp}\geqq T$, then $\tau_2=\tau_1+\tau_{adp}-T$. Adaptive adjustment circuit 102 is designed to apply the appropriate equation to determine $\tau_2$, based upon these criteria.

Figure 7:
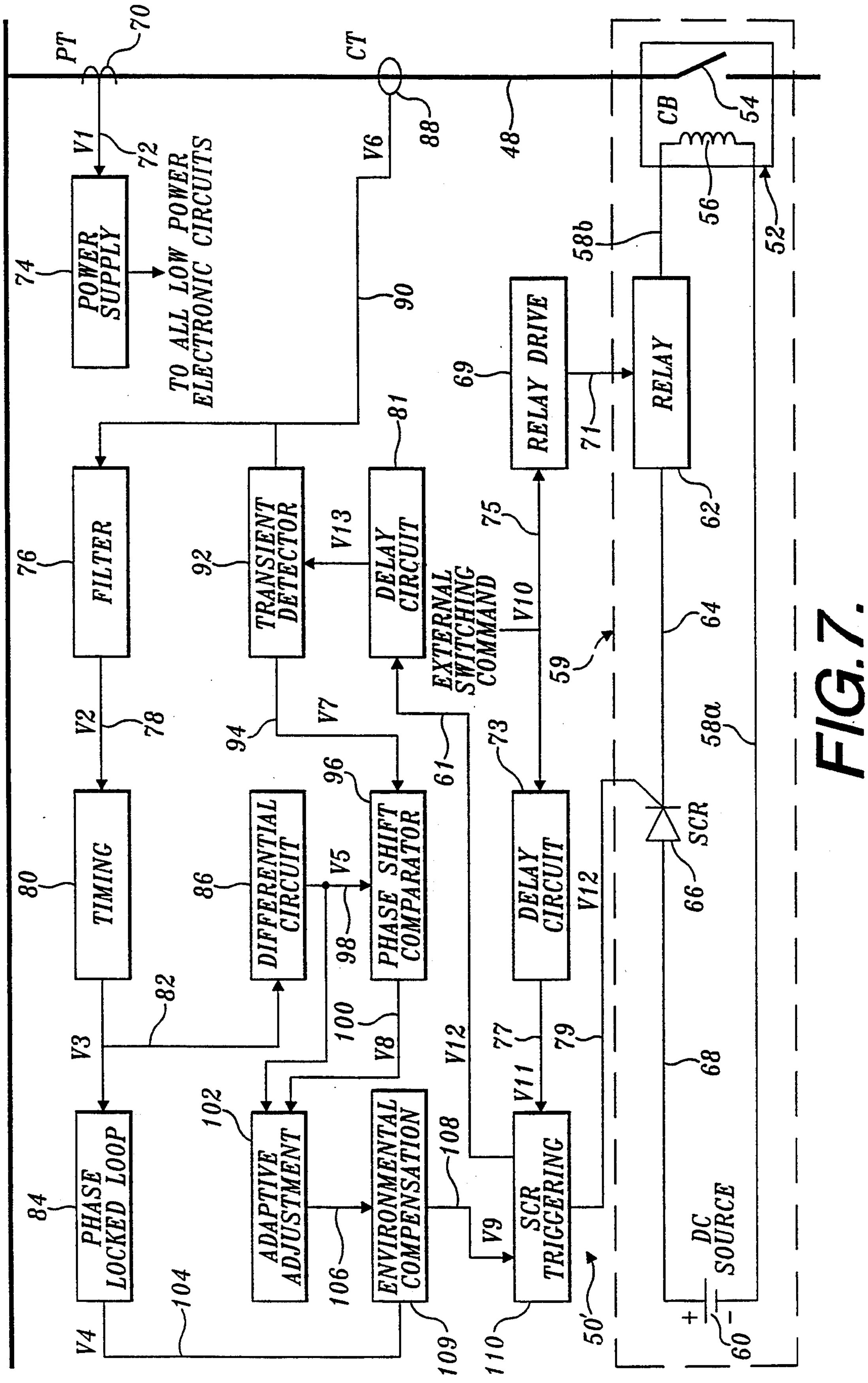
FIG. 7 is a schematic block diagram of the adaptive sequential controller used for minimizing current transients when opening a circuit breaker.

Details of the present invention as applied in a second embodiment to adaptively controlling only the opening of circuit breaker 52 so as to substantially eliminate transients are shown generally in FIG. 7, with respect to an adaptive sequential controller identified by reference numeral 50'. It should be apparent that the embodiment of FIG. 7 is similar to the block diagram in FIG. 4, with the exception that potential transformer 70 does not supply a signal V1 to filter 76 or transient detector 92, and, in addition, phase angle monitor 89 is not used. Instead, as shown in FIG. 7, current transformer 88 supplies signal V6 over line 90 to filter 76. Harmonic distortion present on signal V6 is substantially reduced by filter 76, and a filtered current signal is supplied as signal V2 over line 78 to timing circuit 80. At each zero crossing of the filtered current signal V2, timing circuit 80 produces square wave pulses 206, comprising signal V3. All other components of adaptive sequential controller 50' shown in block diagram FIG. 7 operate as described with regard to the like numbered components in FIG. 4, subject to the caveat that the adaptive compensation is developed to compensate for the response time of circuit breaker 52 after a signal is applied to solenoid 56 to open the circuit breaker, which may be different than the response time required for the circuit breaker to close after it is actuated. In addition, as already noted above, the adaptive sequential controller adjusts the time at which the solenoid is actuated so that the next time it is activated, circuit breaker opens when the current through distribution line 48 is passing through zero.

Figure 8A:
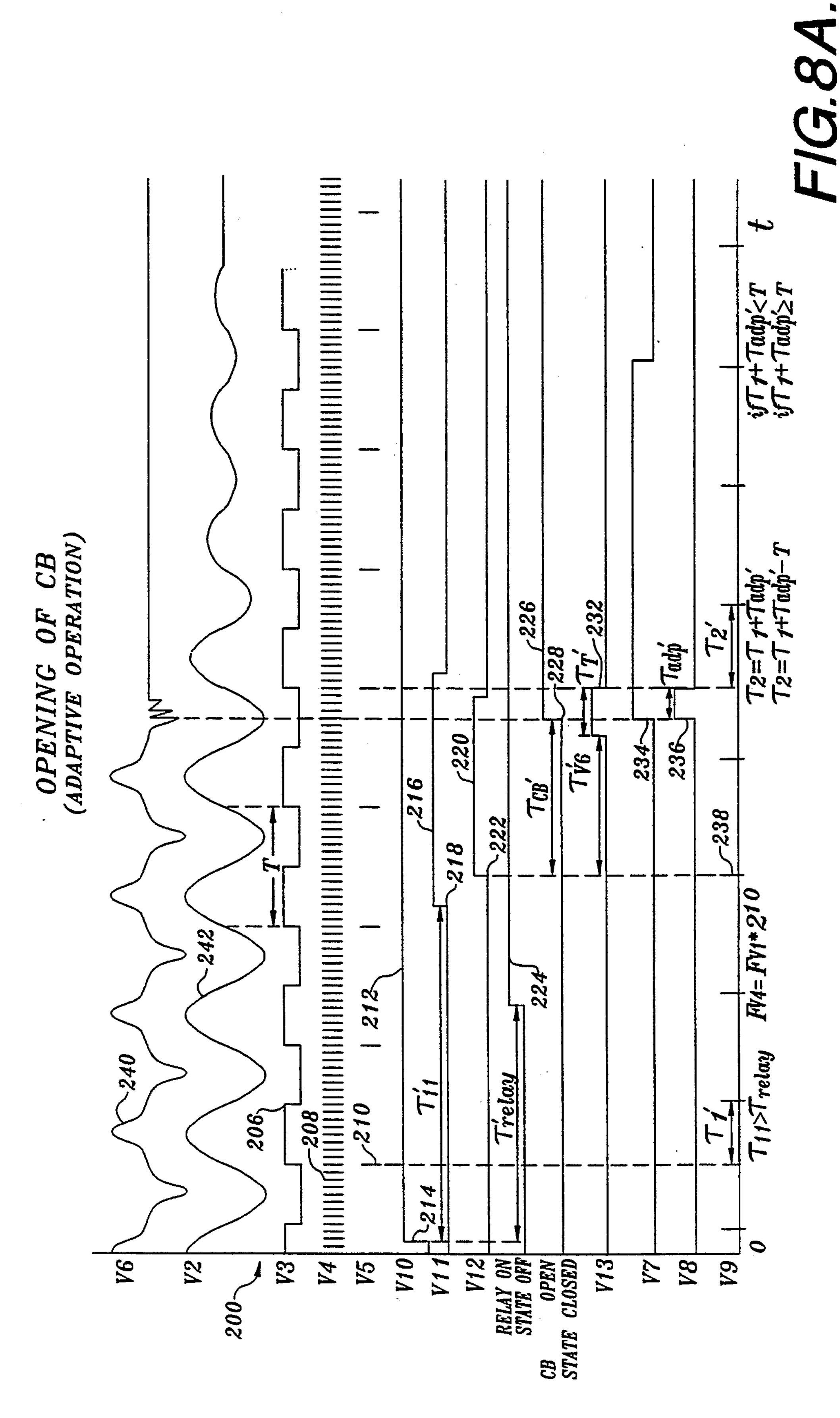
FIG. 8A is a graph illustrating signal waveforms used in the adaptive sequential controller for determining a compensation for controlling the opening of a circuit breaker to minimize transients.
Figure 8B:
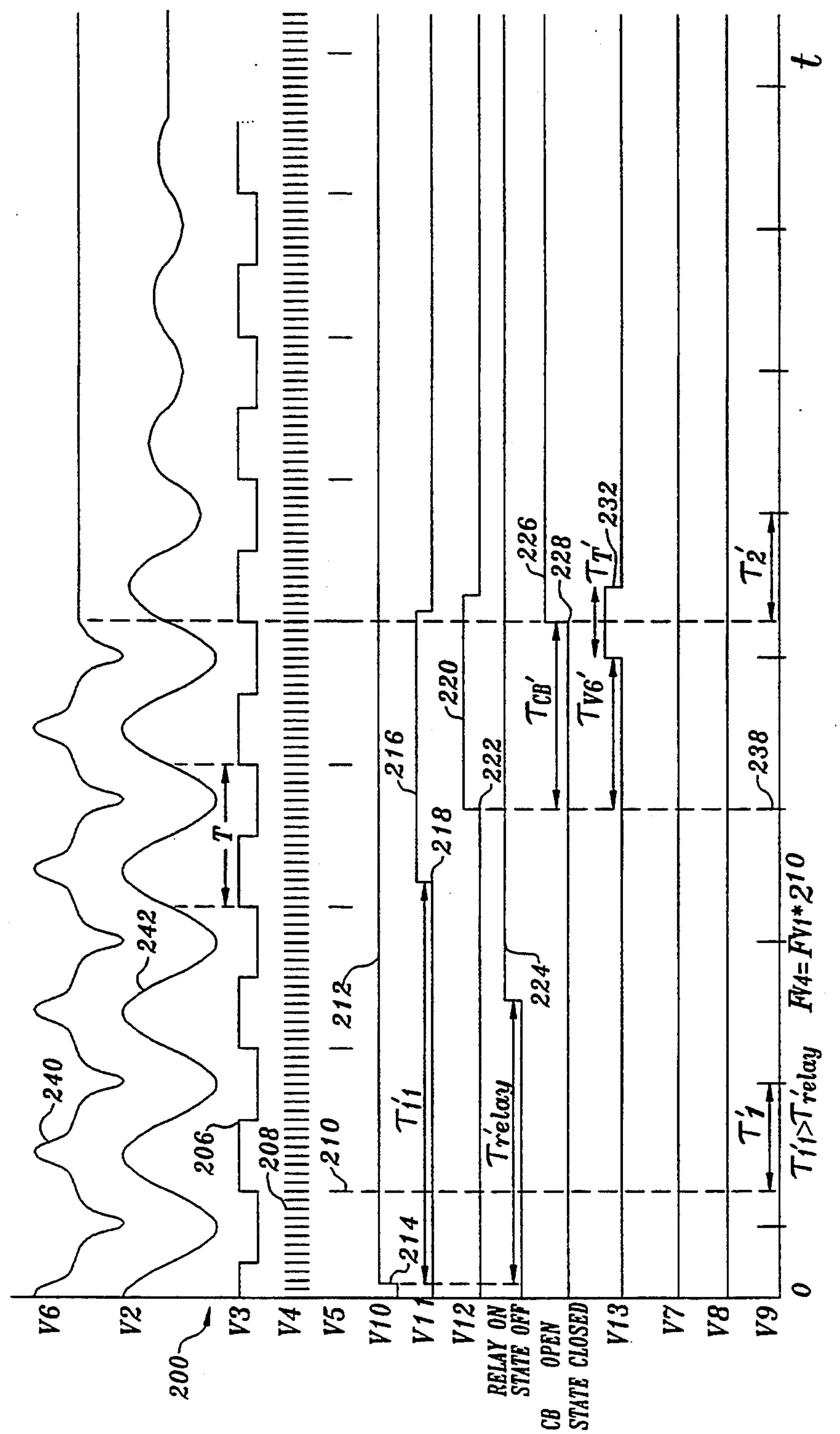
FIG. 8B is a graph illustrating signal waveforms used in the adaptive sequential controller after it is adjusted to use the compensation from FIG. 8A, thereby eliminating transients when opening a circuit breaker.

FIGS. 8A and 8B illustrate the various signals V2 through V13 developed by the components in FIG. 7 to provide adaptive control of circuit breaker 52 to substantially eliminate transients on distribution line 48 that would otherwise be caused by opening the circuit breaker when the current in distribution line 48 is not equal to zero. In FIG. 8A, the adaptive operation of the present invention is shown, illustrating how each of the signals developed determine a correction $\tau_{adp}'$, to compensate for a change in the response time of the circuit breaker as it opens. Adaptive sequential controller 50' can also be used to control one phase of multi-phase breaker on an imbalanced load power line or to control the opening of a plurality of phases of a multi-phase breaker on a balanced load power line.

As indicated by signal V6 in FIG. 8A, a significant transient disturbance is created when circuit breaker 52 opens while the current through distribution line 48 is near its maximum negative value rather than zero. Phase shift comparator 96 determines that an adaptive time interval, $\tau_{adp}'$, corresponding to the width of pulse 236 on signal V8 needs to be made so that the next time circuit breaker 52 opens, the default delay is increased by $\tau_{adp}'$. In FIG. 8B, this adjustment is made, resulting in circuit breaker 52 opening at substantially the point where current through distribution line 48 crosses through zero with a positive slope. As a result, transients on distribution line 48 are substantially eliminated.

As explained with respect to the block diagram shown in FIG. 4, circuit breaker 52 can be adaptively controlled to substantially eliminate transients on distribution line 48 caused by opening the circuit breaker, even though the zero crossing of current is not directly monitored. Instead, the zero crossing point of the voltage on distribution line 48 is monitored and the zero crossing of current is indirectly determined by using phase angle monitor 89. Phase angle monitor 89 produces a signal that is indicative of the phase angle between voltage and current on distribution line 48, and the signal is input to differential circuit 86 over line 91. In response, differential circuit 86 combines a time interval corresponding to the phase angle with the time at which the rising edge of signal V3 occurs (indicative of a positive-going slope voltage zero crossing), producing signal V5. Signal V5 thus comprises pulses 210, each of which occur at the positive-going zero crossing of the current on distribution line 48. Instead of referencing to the timing signal provided by current transformer 88, as is done with regard to the embodiment in FIG. 7, monitoring the phase angle between voltage and current permits reference to the voltage to determine zero crossing times for the current on the distribution line.

As further noted above, if the phase angle between voltage and current is relatively constant on distribution lines 48, an operator can set a phase angle control in differential circuit 86 to the predetermined phase angle. The phase angle setting produces a signal indicative of the constant phase angle, just like the signal produced by phase angle monitor 89. This signal is applied to the voltage zero crossing reference of signal V3 to derive a timing reference to current zero crossing that comprises signal V5.

Figures 9, 10:
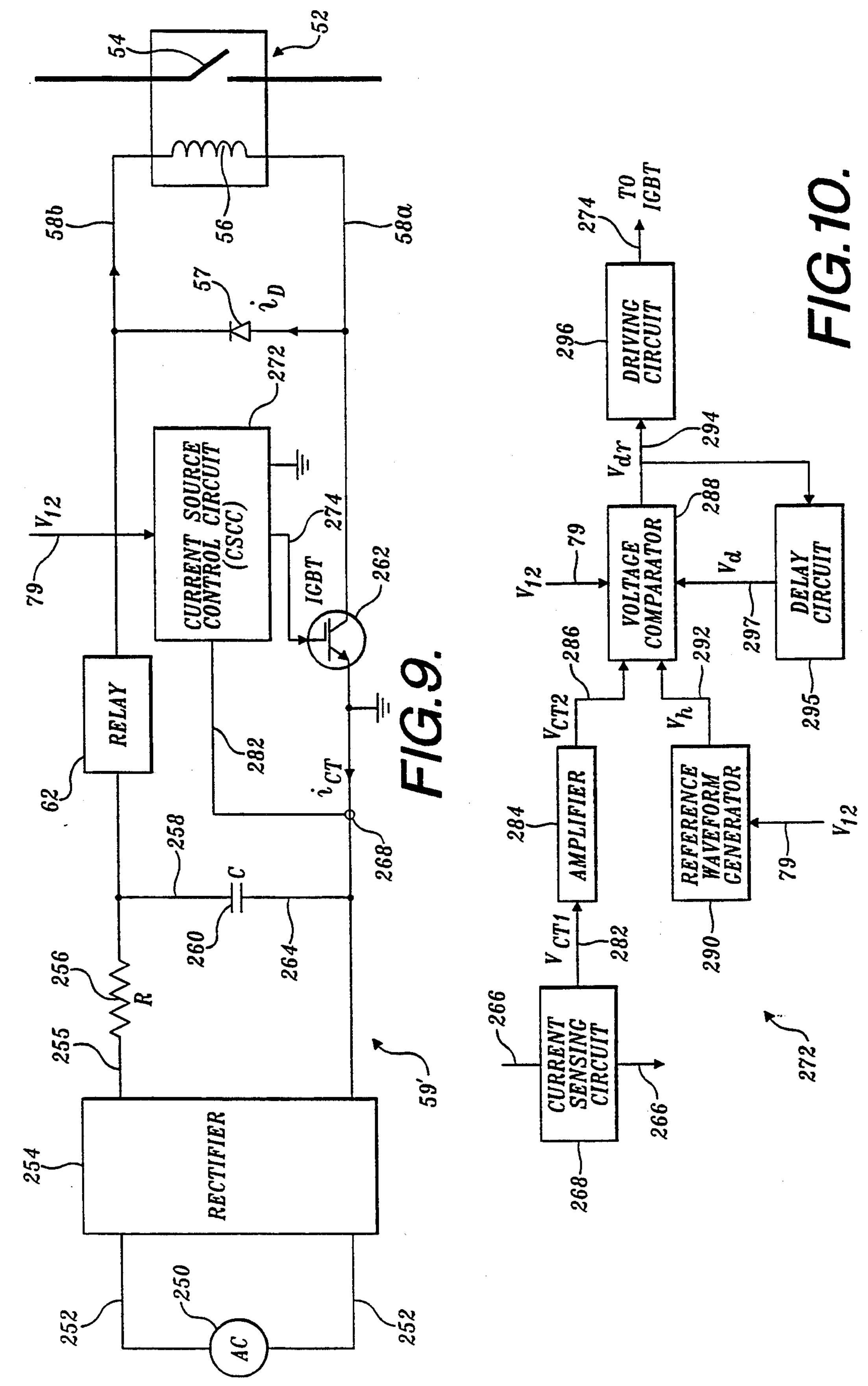
FIG. 9 is a schematic block diagram of an alternative constant current circuit for driving a circuit breaker solenoid using an AC source.
FIG. 10 is a schematic block diagram of a feedback circuit to control and regulate the current supplied to activate a circuit breaker solenoid.

In FIGS. 4 and 7, a circuit breaker activation circuit 59 is illustrated (within the dash lines at the bottom of the figures). FIG. 9 shows an alternative activation circuit indicated generally by reference numeral 59' that can be used in either embodiment of the adaptive sequential controller. The activation circuit shown in FIG. 9 omits DC source 60, replacing it with an AC source 250, which is connected by lines 252 to a full wave rectifier 254. Unlike DC source 60, which typically comprises a battery bank having a relatively stable voltage, AC source 250 is subject to line variations that may cause changes in the response time of circuit breaker 52, which are not readily compensated, because they tend to vary unpredictably. Accordingly, activation circuit 59' regulates the current flow supplied solenoid 56 of circuit breaker 52, thereby compensating for variations in the voltage level of AC source 250. Activation circuit 59' also includes a diode 57 that is connected in parallel with solenoid 56, the cathode of the diode being coupled to relay 62 via lead **58*b***.

A line 255 connects the output of full wave rectifier 254 to one end of a resistor 256, the other end of which is connected to the collector of an insulated gate bipolar transistor (IGBT) 262 by a lead 258. Lead 258 also connects to a capacitor 260, the opposite end of which is connected to the other output of rectifier 254 through a lead 264. The emitter of IGBT 262 is connected through a lead 266 to relay 62, and its base is connected through a line 274 to a current source control circuit (CSCC) 272. CSCC 272 receives a signal indicative of the current flow through solenoid 56 of circuit breaker 52 that is conveyed from a current sensing circuit 268 through a line 282. In addition, CSCC 272 is coupled to line 79 to receive signal V12, which is supplied to control activation of circuit breaker 52. In connection with IGBT 262, CSCC 272 thus regulates the current flow through solenoid 56 when signal V12 conveys pulse 220, causing the CSCC to bias the base of IGBT 262 so that the device conducts current. Regulated current flows through the relay contacts in relay 62, through solenoid 56, and returns through line 264 to full wave rectifier 254. When IGBT 262 is turned on, the current flowing through lead 266, $i_{CT}$, equals the current through solenoid 56, $i_{CB}$, and the current through diode 57, $i_D$, is zero. When IGBT 262 is turned off, $i_{CT}$ is zero, and $I_{CB}$ equals $i_D$.

Figure 11:
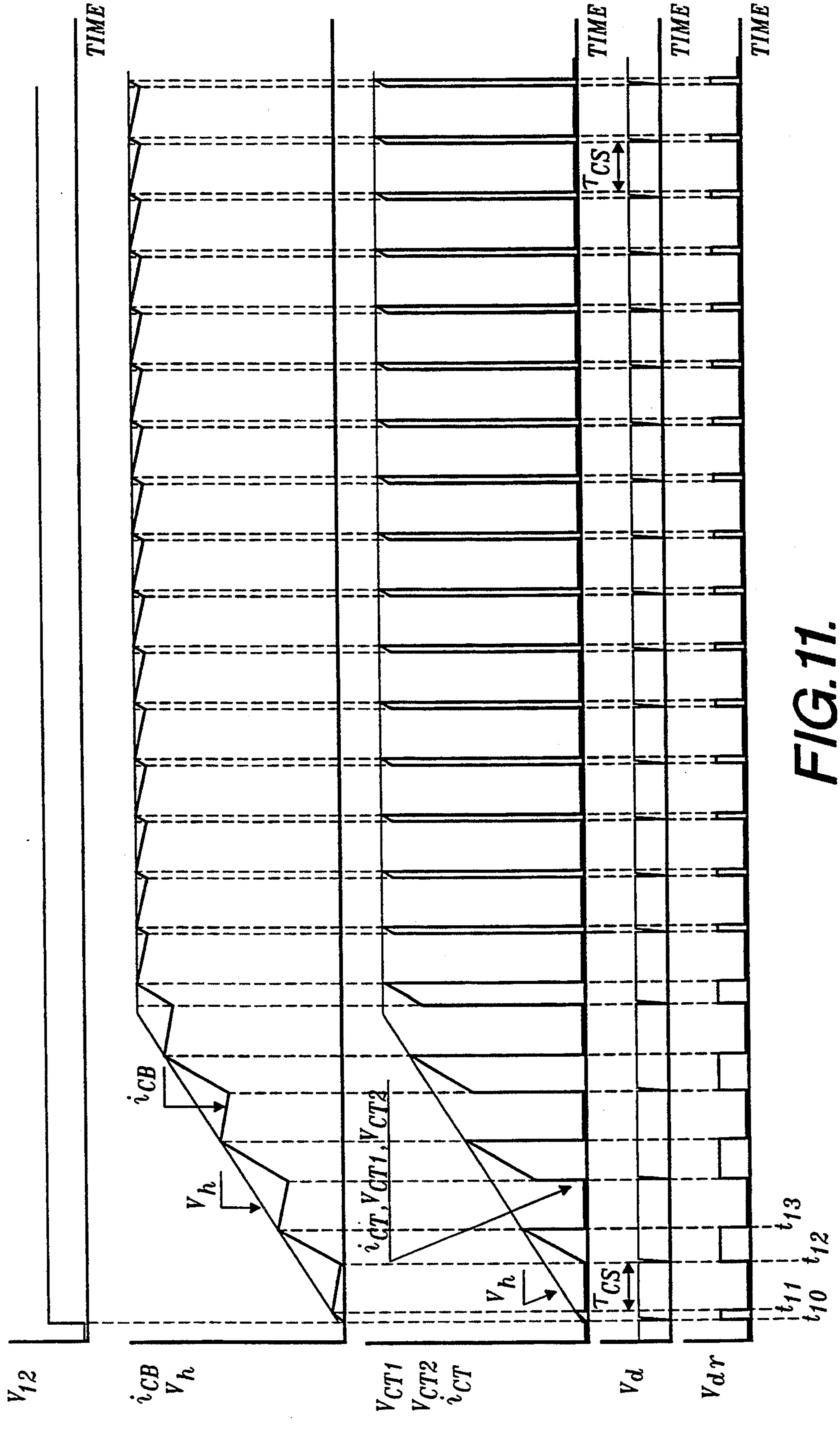
FIG. 11 is a graph showing several waveforms over time of signals used in regulating the current that activates a circuit breaker solenoid.

Details of CSCC 272 are shown in FIGS. 10 and 11. Current sensing circuit 268 produces an output voltage ($V_{CT1}$) proportional to the current ($i_{CT}$) of IGBT 262 that is input to an amplifier 284 over a line 282. Amplifier 284 increases the amplitude of the signal $V_{CT1}$ by a fixed gain, producing an output signal ($V_{CT2}$) that is conveyed on a line 286 to a voltage comparator 288. The other input of voltage comparator 288 is connected through a line 292 to a reference waveform generator 290 that produces a reference voltage waveform ($V_h$) when enabled by signal V12. When signal V12 is high, voltage comparator 288 compares the signal indicative of current flow through IGBT 262 to the desired reference voltage source level $V_h$, and receives a pulse signal, $V_d$, from a delay circuit 295 through a lead 297, producing an output signal $V_{dr}$ that is conveyed by a line 294 to a driving circuit 296. The output of driving circuit 296 is supplied to the base of IGBT 262 to control the conductivity of the device, and thus to regulate the current flow through solenoid 56.

When the rising edge of signal V12 occurs at a time $t_{10}$, reference waveform generator 290 produces a reference voltage $V_h$, and voltage comparator 288 sets its output $V_{dr}$ to a high level. The voltage across storage capacitor 260 is applied to the two ends of solenoid 56 through the conduction of both IGBT 262 and relay 62. The current through solenoid 56 ($i_{CB}$) increases, as also does $V_{CT1}$ and $V_{CT2}$. When IGBT 262 is on, its current $i_{CT}$ is equal to the current $i_{CB}$ through the solenoid. At a time $t_{11}$, $V_{CT2}$ is equal to $V_h$, and voltage comparator 288 sets it output $V_{dr}$ to a low level, which turns IGBT 262 off. The current $i_{CT}$ through the IGBT becomes zero, and so do $V_{CT1}$ and $V_{CT2}$. The solenoid current $i_{CB}$ flows through freewheeling diode 57 and decays. The failing edge of $V_{dr}$ also enables delay circuit 295. After a fixed time ($\tau_{CS}$), at a time $t_{12}$, the delay circuit generates a pulse $V_d$, which makes voltage comparator 288 set its output voltage $V_{dr}$ to a high level. A new period begins. The current flowing through solenoid 56 is thus substantially regulated to a fixed level waveform as shown in FIG. 11.

Figure 12:
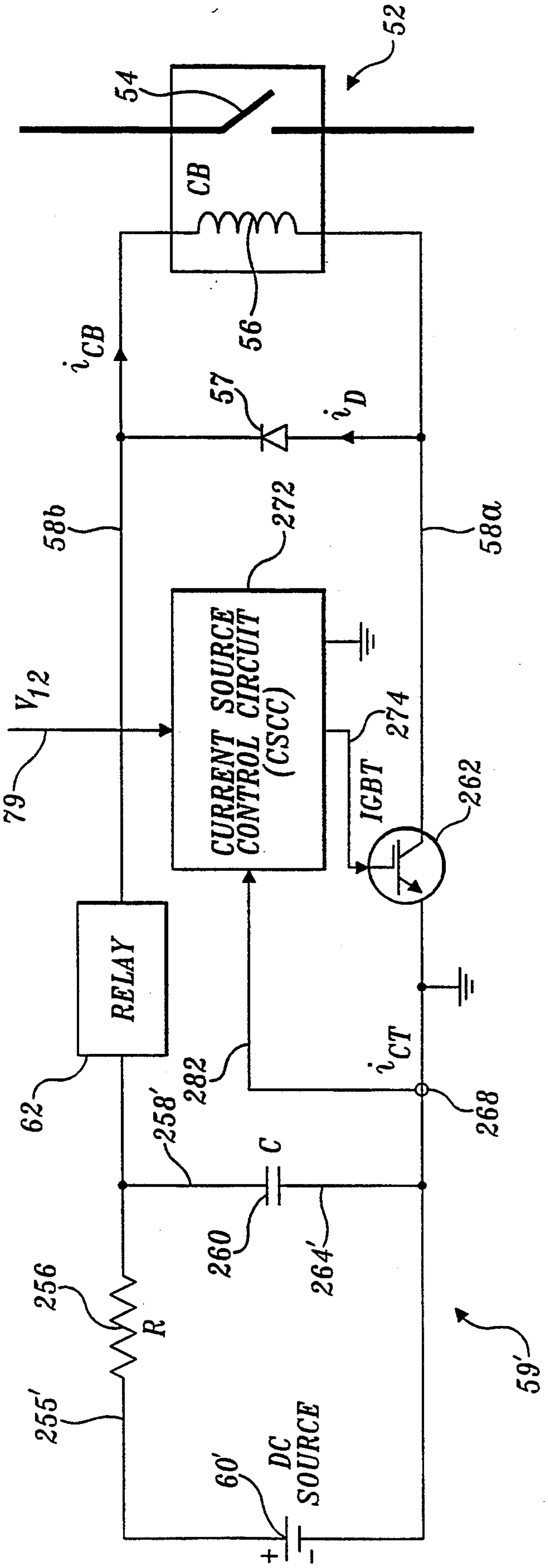
FIG. 12 is a schematic block diagram of another embodiment for a DC constant current circuit used to control and drive the circuit breaker solenoid.

In FIG. 12, a still further embodiment of the activation circuit is generally indicated by reference number 59″. In this embodiment, a DC source 60′ is used that is somewhat less stable than DC source 60 in corresponding circuit 59 and therefore, requires regulation to ensure that the current does not fluctuate, causing variations in the response time of circuit breaker 52. DC source 60′ is connected on the positive side through a line 255′ to resistor 256 and on the negative side through a line 264′ to capacitor 260 and solenoid 56, All other components of the embodiment shown in FIG. 12 are identical to solenoid control circuit 59′, which was discussed above with respect to FIG. 10. CSCC 272 monitors the current flowing through solenoid 56 to develop a positive feedback signal that is used to control the current flow, thereby regulating it to a relatively constant level.

By compensating for changes in the response time of circuit breaker 52 resulting from aging and for changes resulting from the effects of temperature, barometric pressure, and humidity, adaptive sequential controllers 50/50′ provide a significant improvement over prior art devices used to control circuit breakers and other types of switches. For application of the device where the phase angle of the distribution line is relatively constant, it is possible to use potential transformer 70 to provide the timing and reference signals and for detecting transients, eliminating the need for current transformer 88, thereby substantially reducing the cost of a sequential adaptive controller used in controlling both opening and closing of circuit breaker 52. Even in those situations where the power factor changes because of varying loads applied to distribution line 48, phase angle monitor 89 can be used to determine the phase angle between current and voltage on distribution line 48, thereby enabling the timing and reference signal developed in response to the voltage to be used in controlling the opening of the circuit breaker by deriving the current zero crossing reference as a function of the phase angle.

While the preferred embodiment of the invention has been illustrated and described with respect to several variations that can be provided, it will be appreciated that other changes can be made therein without departing from the spirit and scope of the invention. Accordingly, it is not intended that the present invention in any way be limited by the specification, but instead, that the scope of the invention be entirely determined by reference to the claims that follow.

The embodiments of the invention in which an exclusive property or privilege is claimed are defined as follows:

1. An adaptive sequential controller for controlling electrical current flow through an alternating current (AC) power line, comprising:

(a) transformer means, couplable to the power line, for producing a timing signal indicative of a zero crossing of at least one of a periodically varying current and a periodically varying voltage on the power line;

(b) phase angle determinative means, coupled to the transformer means for determining a phase angle between the periodically varying current and the periodically varying voltage on the power line and producing a phase angle signal indicative thereof;

(c) transient detector means, couplable to the power line, for producing a transient signal indicative of the presence of any transient produced when the flow of electrical current through the power line is interrupted or enabled;

(d) delay adjustment means, coupled to the transient detector means to receive the transient signal and coupled to the transformer means to receive the timing signal, for producing a temporal adjustment signal as a function of a time at which the transient occurred relative to the timing signal; and (e) control means, coupled to the delay adjustment means to receive the temporal adjustment signal and to the phase angle determinative means to receive the phase angle signal, for initiating enablement and interruption of electrical current flow through the power line in response to externally produced switching commands at specific times determined as a function of the temporal adjustment signal and the phase angle signal, said temporal adjustment signal being indicative of an adjustment that should be made to actuation times used in initiating the interruption and enablement of electrical current flow through the power line to compensate for changes in inherent delays in switching the electrical current flow through the power line, the actuation times being selected so as to substantially eliminate transients on the power line that are caused by enabling or interrupting electrical current flow through the power line. by enabling the flow of electrical current through the power line generally when the periodically varying voltage crosses zero and interrupting the flow of electrical current through the power line generally when the periodically varying electrical current crosses zero, which is determined as a function of the phase angle signal, said delay adjustment means thereby compensating for such changes in the inherent delays between the initiation of switching the electrical current flow and an actual enablement and actual interruption of the flow of electrical current through the power line.

2. The adaptive sequential controller of claim 1, wherein the phase angle determinative means comprise a control that is manually set by a user to a predetermined phase angle setting to produce the phase angle signal representing the phase angle for the power line.

3. The adaptive sequential controller of claim 1, wherein the transformer means comprise both a potential transformer and a current transformer, and wherein the phase angle determinative means are coupled to the potential transformer and the current transformer to measure the phase angle between the periodically varying current and voltage on the power line to produce the phase angle signal.

4. The adaptive sequential controller of claim 1, wherein the control means comprise switching means for actuating a circuit breaker in the power line, the inherent delay of said circuit breaker in switching the flow of electrical current being subject to change, said delay adjustment means determining any changes in the delay of the circuit breaker and producing the temporal adjustment signal to adjust the actuation times for the circuit breaker during subsequent switching operations.

5. The adaptive sequential controller of claim 4, further comprising a relay control that is also in receipt of the externally produced switching commands; and a normally-open relay disposed in series with the switching means and the circuit breaker, said normally-open relay being closed by the relay control in response to the switching command before the control means initiate enablement of electrical current flow through the power line, said normally-open relay protecting against a failure of the switching means that would enable electrical current to flow in the power line other than in response to the switching command.

6. The adaptive sequential controller of claim 4, wherein the switching means comprise a solid-state switch, and wherein the control means produce a trigger signal that is coupled to the solid-state switch to enable electrical current to flow through the solid-state switch, said electrical current activating the circuit breaker to control the flow of electrical current in the power line.

7. The adaptive sequential controller of claim 1, wherein the transformer means comprise a current transformer, and the timing signal comprises a current signal that is produced by the current transformer, said current signal being indicative of zero crossings of the electrical current flowing in the power line.

8. The adaptive sequential controller of claim 7, wherein the transient detector means comprise the current transformer, the current signal produced by the current transformer including an indication of any transient produced, said transient being caused either by enablement of electrical current flow in the power line at other than a zero crossing of the voltage on the power line or by interruption of the electrical current flow through the power line at other than a zero crossing of the electrical current flowing therein.

9. The adaptive sequential controller of claim 1, wherein the timing signal comprises a low frequency timing signal synchronized to the zero crossings and a high frequency timing signal having a frequency that is an integer multiple of a frequency of the low frequency timing signal and synchronized to it.

10. The adaptive sequential controller of claim 9, wherein said delay adjustment means include comparator means for comparing the transient signal to the low frequency timing signal to produce the temporal adjustment signal; the temporal adjustment signal being used to modify an actuation time that was previously used to determine when switching of the electrical current flow through the power line should be initiated.

11. An adaptive sequential controller for controlling a switching device that is disposed on an AC power line so as to ensure that an inherent time delay of the switching device in responding to a switching signal is adaptively compensated for changes in the inherent time delay, comprising:

(a) a potential transformer couplable to the power line, said potential transformer producing potential signal indicative of zero crossings of a periodic electrical voltage on the power line;

(b) transient detector means, coupled to the potential transformer to receive the potential signal, for detecting transients on the power line that occur when the flow of the electrical current in the power line is enabled by closure of the switching device and interrupted by opening the switching device, said transient detector means producing a transient signal indicative of the time that any such transient occurs;

(c) phase angle determinative means for producing a phase angle signal indicative of a phase angle between a periodic electrical current flowing through the power line and the voltage on the power line;

(d) timing means for producing:

(i) a first timing signal; and (ii) a second timing signal having a frequency that is an integer multiple of the first timing signal and synchronized to it;

(e) comparator means, coupled to the transient detector means to receive the transient signal and coupled to the timing means to receive the first timing signal, for comparing the transient signal to the first timing signal to produce a delay error signal as a function of a difference between the time that a transient was produced due to operation of the switching device and a zero crossing of the voltage on the power line occurred;

(f) adaptive adjustment means, coupled to the timing means to receive the second timing signal and coupled to the comparator means to receive the delay error signal, for producing an adjusted delay signal For use during a subsequent operation of the switching device as a function of:

(i) an actuation time interval used to compensate the inherent time delay of the switching device during a previous switching operation;

(ii) the delay error signal produced as a result of that previous operation; and (iii) the second timing signal; and (g) control means, coupled to the adaptive adjustment means to receive the adjusted delay signal and to the phase angle determinative means for receiving the phase angle signal, For initiating operation of the switching device in response to an externally produced switching command, at a time determined as a function of the adjusted delay signal in response to the phase angle signal, by producing a control signal that enables opening of the switching device, said control means determining the time to initiate the operation of the switching device so that the electrical current flowing through the power line is interrupted at a zero crossing of said current, thereby substantially eliminating transients on the power line.

12. The adaptive sequential controller of claim 11, wherein the phase angle determinative means comprise a control for manual entry of a predetermined phase angle between the voltage and current on the power line, said phase set control producing the phase angle signal in response to a user setting the predetermined phase angle.

13. The adaptive sequential controller of claim 11, further comprising a current transformer that is couplable to the power line, wherein the phase angle determinative means comprise a phase angle monitor that is coupled to the potential transformer and to the current transformer to monitor the phase angle between the voltage and current on the power line, producing the phase angle signal in response thereto.

14. The adaptive sequential controller of claim 11, wherein the timing means are coupled to the potential transformer to receive the potential signal, and wherein the first and the second timing signals are synchronized to zero crossings of the voltage on the power line.

15. The adaptive sequential controller of claim 11, further comprising a current transformer couplable to the power line, said current transformer producing a current signal indicative of zero crossings of the current on the power line, said timing means being coupled to the potential transformer to receive the potential signal and responsive thereto in synchronizing the first and the second timing signals with the zero crossings of the voltage on the power line, and said phase angle determinative means comprising a phase angle monitor that is coupled to both the potential and current transformers to measure the phase angle between voltage and current on the power line.

16. The adaptive sequential controller of claim 11, wherein the control means respond to the switching command by producing the control signal to close the switching device at a time selected so that the flow of electrical current through the power line and through the switching device is enabled substantially at a zero crossing of the voltage on the power line, thereby generally minimizing any arcing on the switching device when it closes and any transients on the power line that would otherwise be caused by closure of the switching device.

17. The adaptive sequential controller of claim 11, further comprising an electrically actuated switch coupled to the control means to receive the control signal, and responsive thereto, said electrically actuated switch conveying an electrical current to operate the switching device in response to the control signal.

18. The adaptive sequential controller of claim 17, further comprising a relay control coupled to receive the switching command; and a relay disposed in series with the electrically actuated switch, the relay control receiving the switching command before the control means and in response thereto, closing the relay before the electrically actuated switch, said relay ensuring that a fault in the electrically actuated switch does not enable operation of the switching device in the absence of the switching command.

19. The adaptive sequential controller of claim 18, further comprising a delay circuit that couples the switching command to the control means, said delay circuit introducing a time delay in the receipt of the switching command by the control means relative to its receipt by the relay control to ensure that the relay is closed before the control means produce the control signal.

20. The adaptive sequential controller of claim 11, further comprising a temperature sensor that is disposed to determine a temperature affecting the delay of the switching device in responding to the control signal and producing a temperature signal indicative of said temperature, said control means being coupled to the temperature sensor to receive the temperature signal and modifying the adjusted delay signal as a function of the temperature signal to compensate it for said temperature.

21. The adaptive sequential controller of claim 11, further comprising a humidity sensor that is disposed to determine an ambient humidity affecting the delay of the switching device in responding to the control signal and producing a humidity signal indicative of said humidity, said control means being coupled to the humidity sensor to receive the humidity signal and modifying the adjusted delay signal as a function of the humidity signal to compensate for said humidity.

22. The adaptive sequential controller of claim 11, further comprising a barometric pressure sensor that is disposed to determine a barometric pressure affecting the delay of the switching device in responding to the control signal and producing a barometric pressure signal indicative of said barometric pressure, said control means being coupled to the barometric pressure sensor to receive the barometric pressure signal and modifying the adjusted delay signal as a function of the barometric pressure signal to compensate for said barometric pressure.

23. The adaptive sequential controller of claim 11, further comprising current regulator means to regulate an electrical current supplied to activate the switching device, said control signal controlling the flow of the electrical current to the switching device to control initiation of the operation of the switching device, said current regulator means substantially minimizing electrical current fluctuations that might otherwise affect and change the inherent time delay of the switching device in responding to the switching signal.

24. The adaptive sequential controller of claim 11, wherein the switching device controls current flow on a plurality of phases of the AC power line, said power line having a substantially balanced load on the plurality of phases so that a predefined phasal relationship exists between the zero crossings of the periodic electrical voltage on each phase of said power line, said control means determining the time to initiate the operation of each phase of said power line by supplying the control signal for each phase delayed in accordance with the predefined phasal relationship between the plurality of phases.

25. The adaptive sequential controller of claim 11, wherein the switching device controls current flow on a plurality of phases of the AC power line, said power line having a substantially imbalanced load on the plurality of phases, wherein said control means initiate operation of the switching device for only one phase, a separate adaptive sequential controller being used for each phase to accommodate differences in phase angles between the voltage and current on each phase.

26. The adaptive sequential controller of claim 11, wherein separate adaptive sequential controllers are used to control initiation of the opening of the switching device and closing of the switching device.

27. A method for controlling a switching device disposed on a power line to suppress arcing and minimize transients on the power line that can otherwise occur when the switching device switches electrical current flow through the power line, comprising the steps of:

(a) producing a timing signal synchronized to zero crossings of at least one of a periodic electrical current flowing in the power line and a periodic voltage on the power line;

(b) detecting any transients on the power line that occur when the switching device opens and closes and producing a transient signal indicative of a time when said transients occur;

(c) producing a phase angle signal indicating a phase angle between the current flowing in the power line and its voltage;

(d) producing an error signal indicating a time interval between the transient signal and the timing signal;

(e) producing an adjusted delay signal as a function of both a previous delay used in operating the switching device and the error signal; and (f) initiating operation of the switching device in response to an externally produced switching command, at a time adaptively determined as a function of the adjusted delay signal and the phase angle signal, said time being determined so as to ensure that the switching device enables the flow of electrical current through the power line when the voltage on the power line is at a zero crossing and interrupts the flow of electrical current through the power line when the electrical current is at a zero crossing in order to substantially eliminate transients caused by operation of the switching device, any changes in a response time of the switching device being compensated by varying said time at which operation of the switching device is initiated after receipt of the externally produced switching command.

28. The method of claim 27, wherein the step of producing a phase angle signal comprises the step of manually setting a control to a predetermined phase angle indicative of the phase angle between the voltage and the current on the power line.

29. The method of claim 27, wherein the step of producing a phase angle signal comprises the steps of monitoring voltage and current on the power line to measure the phase angle and producing the phase angle signal corresponding thereto.

30. The method of claim 27, wherein the step of producing the timing signal comprises the step of producing a first and a second timing signal, both synchronized to the zero crossings of the electrical current flowing through the power line; the second timing signal being an integer multiple of the first timing signal.

31. The method of claim 27, wherein the step of producing the timing signal comprises the step of producing a first and a second timing signal both of which are synchronized to the zero crossing of the voltage on the power line; the second timing signal being an integer multiple of the first timing signal.

32. The method of claim 27, further comprising the step of closing a relay in response to the switching command, but prior to initiating closure of the switching device, closure of said relay being required to enable closure of the switching device, thereby preventing a fault from causing electrical current flow on the power line in the absence of the switching command.

33. The method of claim 32, further comprising the step of delaying the switching command relative to its receipt by the relay, to ensure that the relay closes before the step of initiating operation of the switching device in response to the switching command occurs.

34. The method of claim 27, further comprising the steps of sensing an ambient temperature; and adjusting the time at which the operation of the switching device is initiated as a function of said temperature to compensate for changes in the inherent delay of the switching device due to said temperature.

35. The method of claim 27, further comprising the steps of sensing an ambient humidity; and adjusting the time at which the operation of the switching device is initiated as a function of said humidity to compensate for changes in the inherent delay of the switching device due to said humidity.

36. The method of claim 27, further comprising the steps of sensing a barometric pressure; and adjusting the time at which the operation of the switching device is initiated as a function of said barometric pressure to compensate for changes in the inherent delay of the switching device due to said barometric pressure.

37. The method of claim 27, wherein the error signal is indicative of any changes in the response time of the switching device, the step of producing the adjusted delay signal compensating for such changes to substantially eliminate any transients in subsequent operations of the switching device.

38. The method of claim 27, further comprising the steps of regulating an electrical current supplied to activate the switching device; and controlling the flow of the electrical current to the switching device to control initiation of the operation of the switching device, thereby substantially minimizing electrical current fluctuations that might otherwise affect and change the inherent time delay of the switching device in responding to the switching signal.

39. The method of claim 27, wherein the switching device controls current flow on a plurality of phases of the power line, said power line having a substantially balanced load on the plurality of phases so that a predefined phase relationship exists between the zero crossings of the periodic electrical voltage on each phase of said power line, further comprising the step of determining the time to initiate the operation of each phase of said power line by supplying the control signal for each phase delayed in accordance with the predefined phasal relationship between the plurality of phases.

40. The method of claim 27, wherein the switching device controls current flow on a plurality of phases of the power line, said power line having a substantially imbalanced load on the plurality of phases, further comprising the step of initiating operation of the switching device for each phase separately and independently, to accommodate differences in phase angles between the voltage and current on each phase.

* * * * *